(12) United States Patent
Jain et al.

(10) Patent No.: US 10,095,597 B2
(45) Date of Patent: *Oct. 9, 2018

(54) MANAGING A SET OF WEAR-LEVELING DATA USING A SET OF THREAD EVENTS

(71) Applicant: International Business Machines Corporation, Armonk, NY (US)

(72) Inventors: Chethan Jain, Bangalore (IN); Maria R. Ward, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 18 days.

This patent is subject to a terminal disclaimer.

(21) Appl. No.: 14/994,952

(22) Filed: Jan. 13, 2016

(65) Prior Publication Data

US 2017/0199798 A1    Jul. 13, 2017

(51) Int. Cl.
| | |
|---|---|
| *G06F 9/455* | (2018.01) |
| *G06F 11/30* | (2006.01) |
| *G06F 9/50* | (2006.01) |
| *G06F 11/00* | (2006.01) |
| *G06F 3/06* | (2006.01) |

(52) U.S. Cl.
CPC .......... *G06F 11/3024* (2013.01); *G06F 9/505* (2013.01); *G06F 11/008* (2013.01); *G06F 3/0616* (2013.01); *G06F 9/5094* (2013.01); *G06F 2009/4557* (2013.01)

(58) Field of Classification Search
CPC .............................. G06F 9/4893; G06F 9/5094
See application file for complete search history.

(56) References Cited

U.S. PATENT DOCUMENTS

| | | | |
|---|---|---|---|
| 5,937,428 A | 8/1999 | Jantz | |
| 8,539,139 B1* | 9/2013 | Morris | G06F 13/00 365/185.33 |

(Continued)

OTHER PUBLICATIONS

Lifetime or Energy: Consolidating Servers with Reliability Control in Virtualized Cloud Datacenters Wei Deng, Fangming Liu, Hai Jin, Xiaofei Liao, Haikun Liu, Li Chen Published: 2012.*

(Continued)

*Primary Examiner* — Emerson Puente
*Assistant Examiner* — Paul Mills
(74) *Attorney, Agent, or Firm* — Jared C. Chaney

(57) ABSTRACT

Disclosed aspects include managing a set of wear-leveling data with respect to a set of physical cores of a set of compute nodes. A set of physical cores of the set of compute nodes may be monitored using a set of processor utilization resource registers (PURRs) to identify the set of wear-leveling data. By monitoring the set of physical cores of the set of compute nodes, a set of thread events with respect to the set of physical cores of the set of compute nodes may be detected. Based on the set of thread events, the set of wear-leveling data may be determined. The set of wear-leveling data may then be established in a data store. The wear leveling data may be used to manage asset placement with respect to a shared pool of configurable computing resources.

3 Claims, 20 Drawing Sheets

(56) References Cited

U.S. PATENT DOCUMENTS

| | | | |
|---|---|---|---|
| 8,719,623 B2 | 5/2014 | Biran et al. | |
| 9,069,730 B2 | 6/2015 | Talwar et al. | |
| 9,450,876 B1 | 9/2016 | Marr | |
| 2005/0043910 A1* | 2/2005 | Knebel | G06F 11/008 702/106 |
| 2006/0126107 A1 | 6/2006 | Cheung et al. | |
| 2007/0150581 A1* | 6/2007 | Banerjee | H04L 41/22 709/224 |
| 2007/0260811 A1 | 11/2007 | Merry et al. | |
| 2008/0036487 A1* | 2/2008 | Bradley | G01R 31/31708 324/750.3 |
| 2008/0086395 A1* | 4/2008 | Brenner | G06Q 30/04 705/34 |
| 2008/0162079 A1 | 7/2008 | Astigarraga et al. | |
| 2009/0007078 A1* | 1/2009 | Hoyek | G06F 11/3688 717/131 |
| 2009/0064164 A1* | 3/2009 | Bose | G06F 1/206 718/105 |
| 2009/0132621 A1 | 5/2009 | Jensen et al. | |
| 2009/0138654 A1 | 5/2009 | Sutardja | |
| 2009/0198872 A1 | 8/2009 | Tzeng | |
| 2009/0288092 A1* | 11/2009 | Yamaoka | G06F 9/5033 718/104 |
| 2010/0070784 A1 | 3/2010 | Gupta et al. | |
| 2010/0082884 A1 | 4/2010 | Chen et al. | |
| 2010/0107166 A1* | 4/2010 | Topaloglu | G06F 9/5094 718/102 |
| 2010/0122015 A1 | 5/2010 | Fusella et al. | |
| 2010/0250831 A1 | 9/2010 | O'Brien et al. | |
| 2010/0257306 A1 | 10/2010 | Kawaguchi | |
| 2011/0072302 A1 | 3/2011 | Sartore | |
| 2011/0154321 A1* | 6/2011 | Tian | G06F 1/3203 718/1 |
| 2011/0161851 A1* | 6/2011 | Barber | G06F 9/4856 715/769 |
| 2011/0173432 A1* | 7/2011 | Cher | G06F 17/5045 713/100 |
| 2011/0246701 A1 | 10/2011 | Kano et al. | |
| 2011/0265090 A1* | 10/2011 | Moyer | G06F 1/3203 718/103 |
| 2011/0271046 A1 | 11/2011 | Iyer et al. | |
| 2011/0295999 A1 | 12/2011 | Ferris et al. | |
| 2012/0036398 A1* | 2/2012 | Moyer | G06F 9/505 714/48 |
| 2012/0297174 A1* | 11/2012 | Frank | G06F 9/5011 713/1 |
| 2013/0054881 A1 | 2/2013 | Ellis et al. | |
| 2013/0148435 A1 | 6/2013 | Matsunaga | |
| 2013/0263120 A1 | 10/2013 | Patil et al. | |
| 2014/0096139 A1 | 4/2014 | Alshinnawi et al. | |
| 2014/0214496 A1 | 7/2014 | Macbeath et al. | |
| 2014/0281260 A1 | 9/2014 | Peterson et al. | |
| 2014/0359350 A1 | 12/2014 | Plank et al. | |
| 2015/0169363 A1* | 6/2015 | Anderson | G06F 9/4893 718/103 |
| 2015/0332488 A1* | 11/2015 | Beck | G06K 9/6201 345/440 |

OTHER PUBLICATIONS

Lifetime Improvement through Runtime Wear-based Task Mapping Adam S. Hartman and Donald E. Thomas Published: 2012.*
Understanding Processor Utilization on Power Systems—AIX Author identified by the handle: "OneSkyWalker" Published: Dec. 19, 2012.*
Definition of Frequency Retrieved From: http://techterms.com/definition/frequency Published: Dec. 27, 2011.*
Definition of Processor Frequency Retrieved From: http://www.futura-sciences.us/dico/d/computer-science-processor-frequency-50001240 Published: No later than Jan. 8, 2017.*
Definition of CPU Frequency Retrieved From: http://www.cpu-world.com/Glossary/C/CPU_Frequency.html Published: Dec. 14, 2016.*
Facelift: Hiding and Slowing Down Aging in Multicores Abhishek Tiwari and Josep Torrellas Published: 2008.*
Fully Automatic and Precise Detection of Thread Safety Violations Michael Pradel, Thomas R. Gross Published: 2012.*
Delivering Affordable Fault-tolerance to Commodity Computer Systems Shuguang Feng p. 10-63 Published: 2011.*
Error Log Analysis: Statistical Modeling and Heuristic Trend Analysis Ting-Ting Y. Lin, Daniel P. Siewiorek Published: 1990.*
Mell, Peter, et al., The NIST Definition of Cloud Computing, National Institute of Standards and Technology, Oct. 7, 2009, Version 15, NIST, Gaithersburg, MD, US.
Polze, Andreas, et al.; "Timely Virtual Machine Migration for Pro-Active Fault Tolerance"; <http://www.citemaster.net/get/a7b95192-8933-11e3-8b29-00163e009cc7/polze11timely.pdf>.
List of IBM Patents or Patent Applications Treated as Related.
Deng et al.; "Reliability-aware Server Consolidation for Balancing Energy-Lifetime Tradeoff in Virtualized Cloud Datacenters"; International Journal of Communication Systems, vol. 27, Issue 4, pp. 623-642, Apr. 2014.
Jammal et al.; "CHASE: Component High Availability-Aware Scheduler in Cloud Computing Environment"; 2015 IEEE 8th International Conference on Cloud Computing, pp. 477-484, Jun. 27, 2015-Jul. 2, 2015.
BAAT: Towards Dynamically Managing Battery Aging in Green Datacenters Longjun Liu, Chao Li, Hongbin Sun, Yang Hu, Juncheng Gu, and Tao Li Published:2015.
Thread Relocation: A Runtime Architecture for Tolerating Hard Errors in Chip Multiprocessors Omer Khan and Sandip Kundu Published: 2010.
Jain et al., "Managing Asset Placement Using a Set of Wear Leveling Data," U.S. Appl. No. 14/994,910, filed Jan. 13, 2016.
Jain et al., "Managing a Set of Wear-Leveling Data Using a Set of Bus Traffic," U.S. Appl. No. 14/994,934, filed Jan. 13, 2016.
Jain et al, "Managing a Set of Wear-Leveling Data Using a Set of Thread Events," U.S. Appl. No. 15/841,419.
List of IBM Patents or Patent Publications Treated as Related, Dated Dec. 15, 2017, 2 pages.
Tang et al., "Exploring Hardware Profile-Guided Green Datacenter Scheduling," IEEE 2015 44th International Conference on Parallel Processing, 2015, 10 pages.

* cited by examiner

900

Table 910A

| Resource | WEAR LEVELING FACTOR IN USAGE (%) | | | |
|---|---|---|---|---|
| | SERVER-1 | SERVER-2 | SERVER-3 | SERVER-4 |
| CPU | 10 | 20 | 30 | 40 |
| MEM | 40 | 60 | 70 | 40 |
| I/O | 50 | 30 | 60 | 40 |
| Storage | 60 | 70 | 50 | 80 |
| Best CPU | X | | | |
| Best I/O | | X | | |
| Best MEM | | | | X |
| Best Storage | | | X | |

Table 910B

| Resource | VM Priority | |
|---|---|---|
| | VM-1 | VM-2 |
| CPU | MEM | Storage |
| MEM | I/O | CPU |
| I/O | CPU | I/O |
| Storage | Storage | MEM |
| Best Server | SERVER-4 | SERVER-3 |

| Memory DIMM | Memory Controller/bus | Processor Module | No of Reads | No of Writes |
|---|---|---|---|---|
| Memory 0 | MC0 | Proc Mod 0 | 16000 | 4000 |
| Memory 1 | MC1 | Proc Mod 1 | 400 | 20000 |
| Memory 2 | MC2 | Proc Mod 2 | 10000 | 500000 |
| Memory 3 | MC3 | Proc Mod 3 | 16000 | 16000 |

|        | L CPU1 | L CPU2 | L CPU3 | L CPU4 | Total PURR |
|--------|--------|--------|--------|--------|------------|
| Core 1 | 24     | 670    | 12     | 19     | 725        |
| Core 2 | 41     | 400    | 99     | 17     | 557        |
| Core 3 | 65     | 34     | 122    | 19     | 240        |
| Core 4 | 24     | 900    | 127    | 90     | 1141       |

FIG. 18

MANAGING A SET OF WEAR-LEVELING DATA USING A SET OF THREAD EVENTS

BACKGROUND

This disclosure relates generally to computer systems and, more particularly, relates to managing asset placement with respect to a shared pool of configurable computing resources. The amount of data that needs to be managed by enterprises is increasing. Asset placement may be desired to be performed as efficiently as possible. As data needing to be managed increases, the need for efficient asset placement management may increase.

SUMMARY

Aspects of the disclosure include managing a set of wear-leveling data with respect to a set of physical cores of a set of compute nodes. A set of physical cores of the set of compute nodes may be monitored using a set of processor utilization resource registers (PURRs) to identify the set of wear-leveling data. By monitoring the set of physical cores of the set of compute nodes, a set of thread events with respect to the set of physical cores of the set of compute nodes may be detected. Based on the set of thread events, the set of wear-leveling data may be determined. The set of wear-leveling data may then be established in a data store. The wear leveling data may be used to manage asset placement with respect to a shared pool of configurable computing resources.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 9 depicts an example wear-leveling data set and an example component prioritization data set, according to embodiments.

FIG. 14 depicts a table illustrating an example set of utilization data for a set of compute nodes of a server environment, according to embodiments.

FIG. 18 illustrates an example utilization result for a compute node, according to embodiments.

Figure 1:
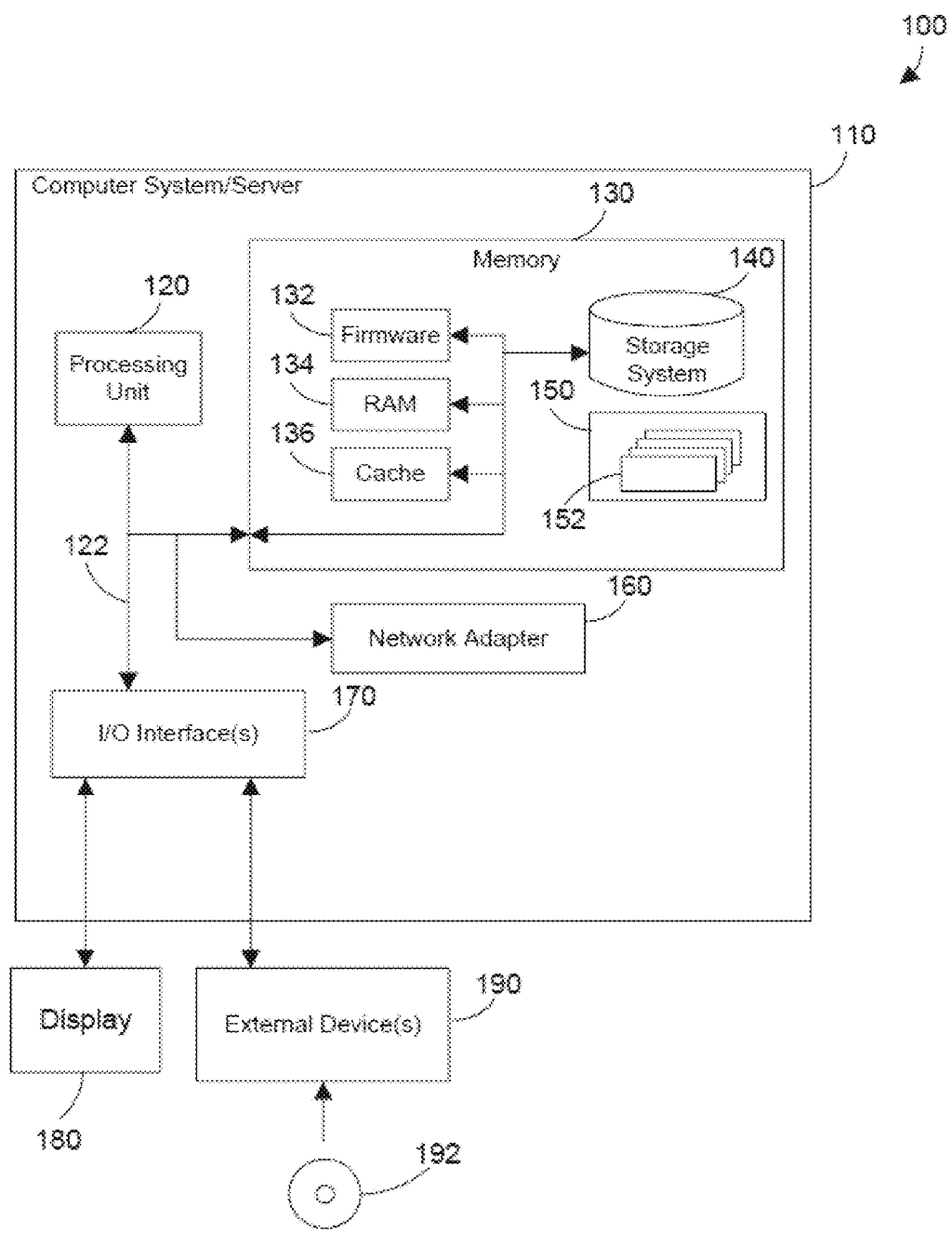
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include managing asset placement (e.g., virtual machine placement) with respect to a set of wear-leveling data (e.g., historical usage data) of a set of hosts. As described herein, asset placement can use the set of wear-leveling data to determine an appropriate host for a particular virtual machine based on the resource needs of the virtual machine as well as the usage history of the host. One or more hosts may be evaluated based on their usage history, and assets may be placed on hosts based both on the wear-data for the host as well as component prioritization data (e.g., desired resource usage) of the assets. As described herein, such a configuration may provide performance and efficiency benefits (e.g., virtual machines may have access to desired resources with reduced risk of host device failure).

Hardware failure is a common problem that can impact any enterprise. Cloud consumers go to great lengths to protect their infrastructure from hardware failures. A large amount of time and effort is spent creating backups for each machine and data resource present in the architecture to ensure no single point of failure. While backups are one solution, they are not cost effective as businesses must maintain redundant resources to address potential hardware failures. Additionally, in some situations, primary hardware may be excessively used while secondary resources remain idle, leading to an imbalance of resource distribution and utilization. Resource imbalances such as these can lead to early hardware failure as particular hardware resources are placed under heavy workloads. Accordingly, aspects of this disclosure are directed toward placing assets on hosts based on the degree of wear (e.g., wear level) of the host. By placing assets on lesser used hosts, the risk of hardware failure arising from resource imbalance may be reduced. Placement of assets based on host wear levels may be associated with benefits such as prolonged hardware service life, favorable resource distribution and hardware accessibility, performance and efficiency.

Aspects of the disclosure include a method, system, and computer program product for managing asset placement with respect to a shared pool of configurable computing resources. The set of assets may include a set of virtual machines. In embodiments, a set of wear-leveling data for a set of hosts of the shared pool of configurable computing resources may be detected. Detecting the set of wear-leveling data for the set of hosts may include retrieving individual host-specific wear-leveling data from one or more individual hosts of the set of hosts. In embodiments, detecting the set of wear-leveling data may include computing the set of wear-leveling data based on historical utilization of the set of hosts. The set of hosts may include a group of components. The group of components may include one or more of a processor component, a memory component, a storage component, or an input-output (I/O) component. In embodiments, the set of wear-leveling data may include a set of wear-scores that indicate a set of historical utilization ages (e.g., of the set of hosts). The set of wear-leveling data for the set of hosts may also include a group of component wear-leveling data for the group of components of the set of hosts.

Aspects of the disclosure are directed toward determining a placement arrangement for the set of assets with respect to the set of hosts of the shared pool of configurable computing resources. The placement arrangement may be determined based on the set of wear-leveling data. In embodiments, the placement arrangement may be based on a lesser utilized hardware factor which indicates a lesser likelihood of a hardware error event. Determining the placement arrangement for the set of assets may include comparing a first wear-score of the set of wear-scores with a second wear-score of the set of wear scores. The first wear-score may correspond to a first component of the first host, and the second wear-score may correspond to the first component of a second host. In embodiments, it may computed that the second wear-score exceeds the first wear-score. In response to computing that the second wear-score exceeds the first wear score, a first host which corresponds to the first wear-score may be utilized in the placement arrangement for the set of assets. The set of assets may include a first asset which has an operational priority related to the first component. In embodiments, the set of assets may be placed such that the first asset is placed on the first host.

In embodiments, determining the placement arrangement for the set of assets with respect to the set of hosts may include analyzing the set of wear-leveling data, and evaluating the set of assets with respect to the set of wear-leveling data. In certain embodiments, determining the placement arrangement for the set of assets may include ascertaining a set of component prioritization data for the set of assets. The set of component prioritization data for the set of assets may include either a user-provided feature or an automatically-generated feature based on asset performance. In response to ascertaining the set of component prioritization data for the set of assets, the set of component prioritization data may be compared with respect to the set of wear-level data. In response to comparing the set of component prioritization data with respect to the set of wear-leveling data, a set of asset-host unions may be identified that indicate a specific asset for placement on a specific host.

In embodiments, determining the placement arrangement for the set of assets may include managing an expected usage of the set of components of the set of hosts. Managing the expected usage of the set of hosts may include determining a first candidate placement arrangement having a first expected usage of a first component, and a second candidate placement arrangement having a second expected usage of the first component. By comparing the first and second expected usages of the first component, one of either the first or second candidate placement arrangements may be determined as the placement arrangement. In certain embodiments, the first candidate placement arrangement may have a first expected usage of a second component, and the second candidate placement arrangement may have a second expected usage of the second component. In response to substantial comparative similarity between the first and second expected usages of the first component, determining the placement arrangement may include comparing the first and expected usages of the second component.

Aspects of the disclosure are directed toward placing, based on the placement arrangement, the set of assets with respect to the set of hosts of the shared pool of configurable computing resources. Placing the set of assets may include allocating or assigning the assets to the hosts determined by the placement arrangement. In embodiments, aspects of the disclosure are directed toward metering use of the placement arrangement, and generating an invoice based on the metered use.

Aspects of the disclosure, in certain embodiments, are directed toward a system and method for determining the wear-leveling data based on system bus traffic across microprocessor architecture. As described herein, the set of components of the set of hosts may include a set of compute nodes connected by a system bus. By monitoring the traffic of the system bus (e.g., number, type and frequency of jobs, read requests, write requests), the degree of utilization of each node of the set of compute nodes may be determined. Wear-leveling data for each compute node may then be calculated based on the set of bus traffic. Accordingly, the wear-leveling data may then be used to determine a placement arrangement for the set of assets with respect to the set of hosts. Other methods of determining the wear-leveling data and the placement arrangement for the set of assets is also possible.

Aspects of the disclosure, in certain embodiments, are directed toward a system and method for determining the wear-leveling data based on processor utilization. As described herein, the set of compute nodes of the set of hosts may include one more processing modules. By monitoring the degree of utilization of the set of processing modules and detecting a set of thread events (e.g., job completion status, job completion time, error events), wear-leveling data may be calculated for the set of processing modules. Accordingly, the wear-leveling data may then be used to determine a placement arrangement for the set of assets with respect to the set of hosts. Other methods of determining the wear-leveling data and the placement arrangement for the set of assets is also possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
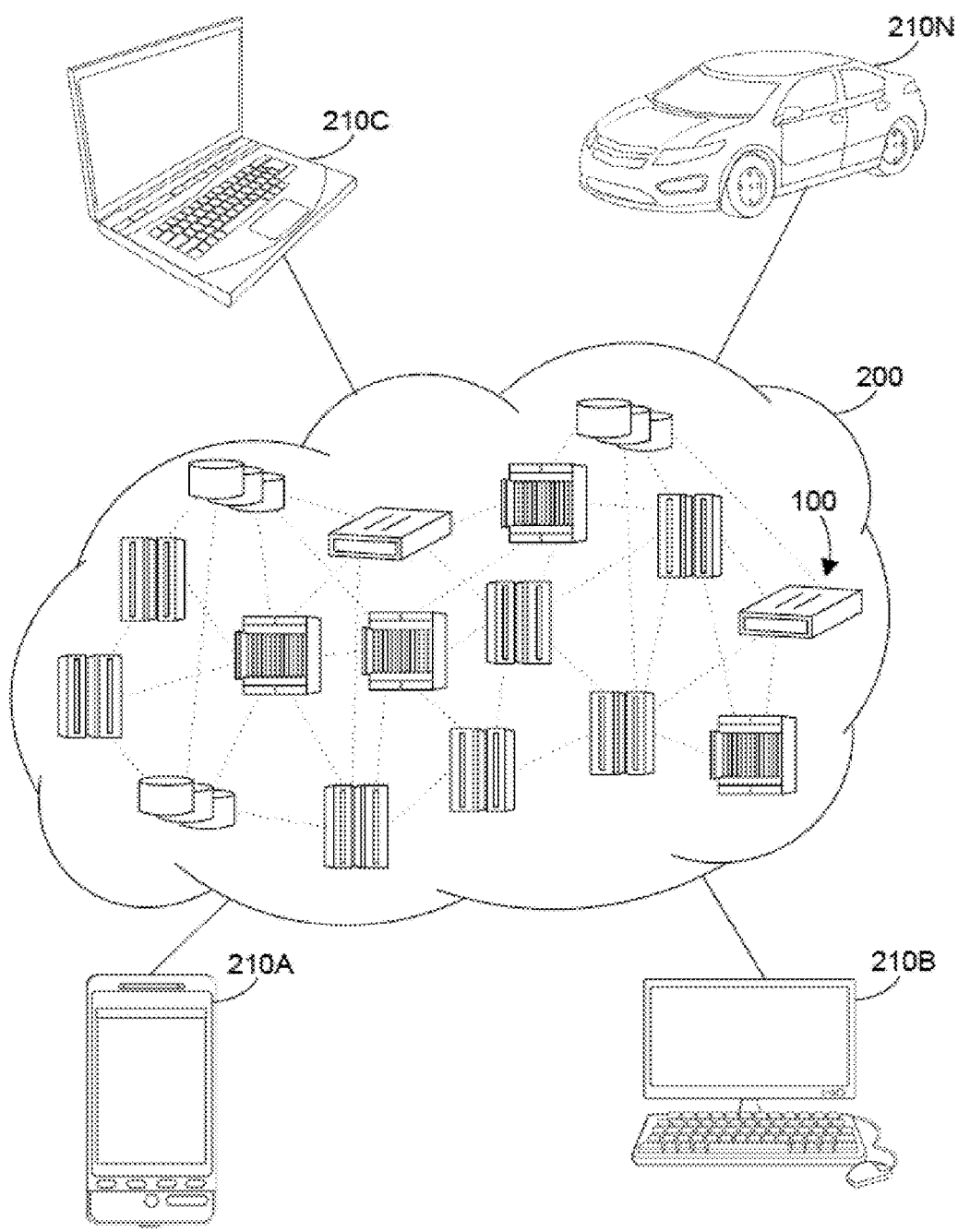
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
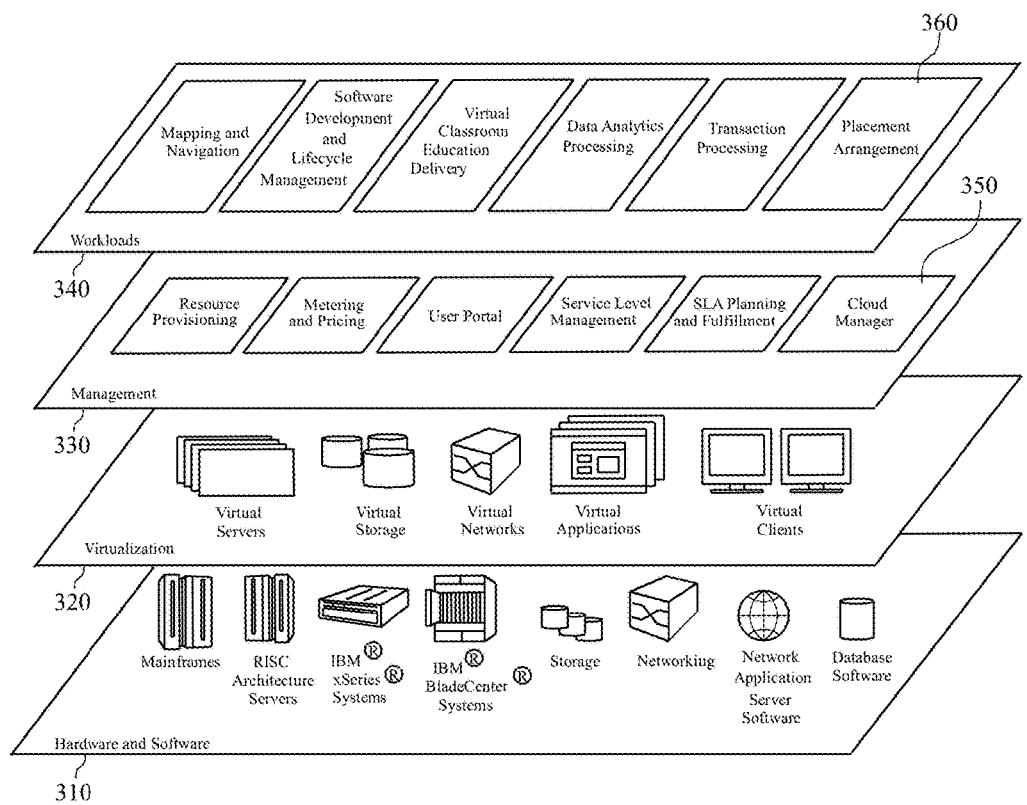
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a placement arrangement 360, which may be utilized as discussed in more detail below.

Figure 4:
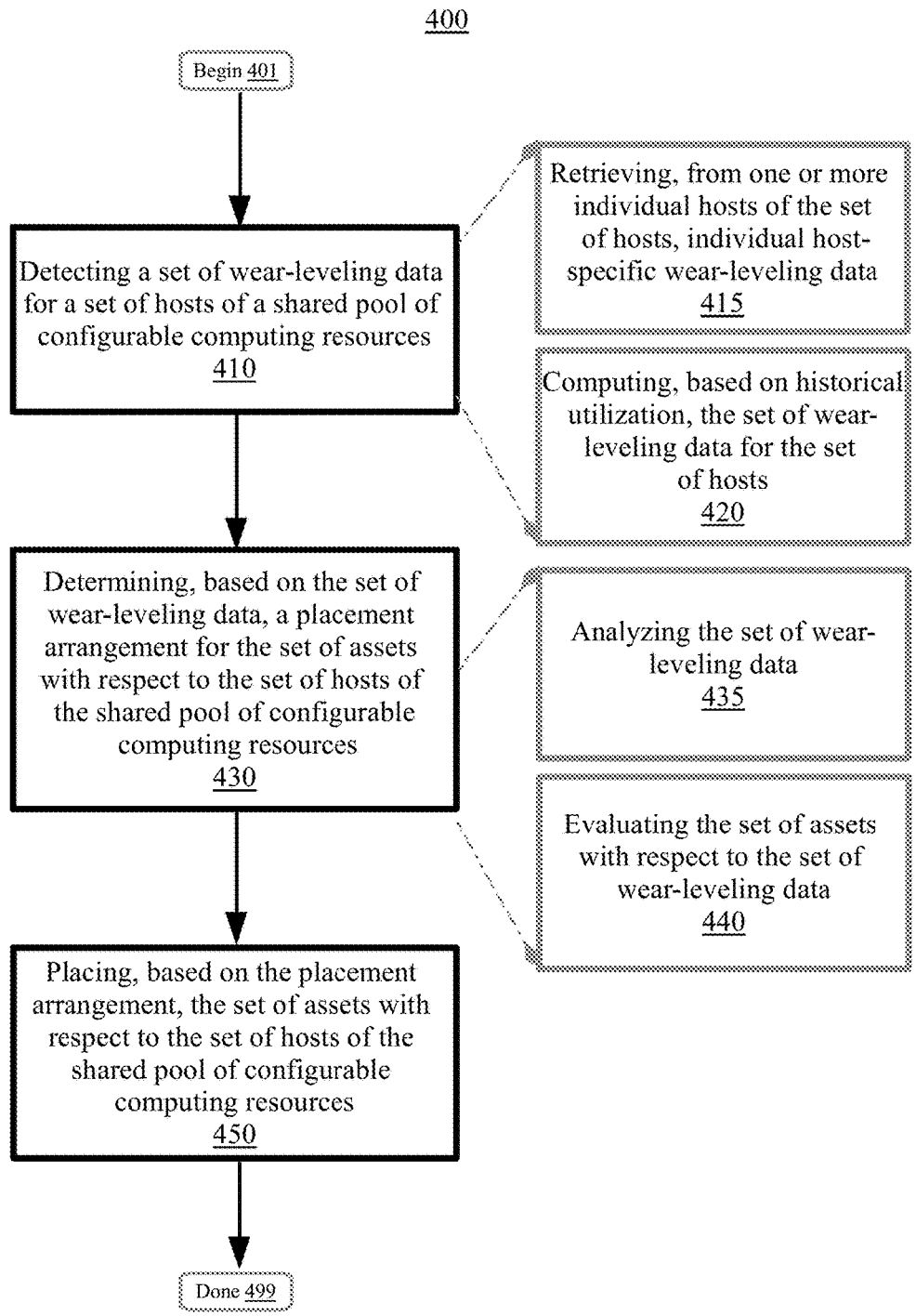
FIG. 4 is a flowchart illustrating a method of managing asset placement with respect to a shared pool of configurable computing resources, according to embodiments.

FIG. 4 is a flowchart illustrating a method 400 of managing asset placement with respect to a shared pool of configurable computing resources according to embodiments. When deploying an asset on a host, the process of selecting the most suitable host for the asset can be termed placement. Considerations for placement include historical component usage, hardware/resource requirements and anticipated usage of resources. Illustrative placement initiatives can include efficient resource utilization on individual hosts or load balancing among hosts (e.g., for performance benefits). Method 400 may begin at block 401. As shown in FIG. 4, method 400 may include a detecting block 410, a retrieving block 415, a computing block 420, a determining block 430, an analyzing block 435, an evaluating block 440, and a placing block 450. In embodiments, a set of assets (to be placed) includes a set of virtual machines. Other assets are contemplated such as various software application programs.

At block 410, a set of wear-leveling data for a set of hosts of the shared pool of configurable computing resources may be detected (e.g. received, collected) with respect to the set of assets. The set of wear-leveling data may include statistics and other information that indicate a degree of usage of the set of hosts. The set of wear-leveling data may be quantified and expressed in one of a number of ways. For instance, in embodiments, the wear level of a host may be represented as the number of hours a device has remained powered on, the number of RPMs a device has made over its lifetime (e.g., for a spinning disk device), or a composite wear score that represents an aggregation of multiple aspects indicative of device usage. As an example, the wear score may be expressed as an integer value between 0 and 100, where lesser values (e.g., 13) represent little wear, and greater values (e.g., 86) represent greater wear. Lesser wear scores may be associated with lower likelihoods of hardware failure, extended component life spans, and efficiency. Other methods of quantifying and expressing wear-leveling are also possible.

In embodiments, the set of hosts may include a group of components. The group of components may include one or more of a processor component, a memory component, a storage component, an input-output component and the like. Other types of components are also possible. The set of wear-leveling data for the set of hosts may include a group of component wear-leveling data for the group of components of the set of hosts. For example, for a particular host, a processor component may have a wear score of 45, a memory component may have a wear score of 61, a storage component may have a wear score of 33, and an input-output component may have a wear score of 36. As described herein, the set of wear leveling data may be used to determine a placement arrangement for a set of assets on a set of hosts.

As described herein, at block 410 a set of wear-leveling data may be detected with respect to a set of assets (e.g., virtual machines). Generally, detecting the set of wear-leveling data may include identifying, extracting, calculating, recognizing, ascertaining, or determining one or more factors that are indicative of the usage of the set of hosts or one or more components of the set of hosts. As depicted at block 415, in certain embodiments detecting the set of wear-leveling data may include retrieving host-specific wear-leveling data from one or more individual hosts of the set of hosts. Retrieving the host specific wear-leveling data may include a network or system administrator accessing one or more hosts of the set of hosts, and collecting individual wear-leveling data regarding the hosts. In embodiments, the network or system administrator may individually evaluate the hosts by running diagnostics or other system tests to evaluate the usage level of each host. In embodiments, the host may be configured to collect and store data regarding its own utilization history and evaluate its own wear level. This wear level evaluation may be stored on the host, and be configured to be retrieved by a network administrator.

At block 420, detecting the set of wear-leveling data may include computing the set of wear-leveling data for the set of hosts. The set of wear-leveling data may be computed based on historical utilization data for each host. The historical utilization data for each host may be maintained and computed individually for each component of the host (e.g., storage device, memory, CPU). As an example, for a storage device such as a solid state drive, the number of read and write operations performed over its history may be considered as one factor that contributes to its overall wear level. In embodiments, the computed wear-leveling data for each component of the host may be aggregated to generate a composite wear score for the host. For instance, a host that includes a storage device with a wear score of 22, a memory device with a wear score of 54, and a CPU with a wear score of 61 may be determined to have a composite wear score of 46. The composite wear score for each host of the set of hosts may be transmitted to a shared server accessible by a network administrator. Other methods of computing the wear score of the hosts and maintaining the wear leveling data are also possible.

At block 430, a placement arrangement may be determined for the set of assets with respect to the set of hosts. The placement arrangement may be determined based on the set of wear-leveling data. Generally, the placement arrangement may include a configuration for deployment of various virtual machines (e.g., to a plurality of hosts). An example placement arrangement may prioritize accommodation of assets to hosts that have lower wear levels (e.g., associated with longer remaining usage life spans). Further, an operational priority (e.g., rank or preference of available resources) of one or more assets that is related to a component of a host may be used to determine placement of the asset. As described herein, other methods of determining the placement arrangement are also possible (e.g., balancing performance differently across groups of hosts).

In embodiments, determining the placement arrangement for the set of assets may include analyzing the set of wear-leveling data at block 435. Analyzing the set of wear-leveling data may include examining the utilization history and other usage statistics of the set of hosts and the group of components of each host. In embodiments, analyzing the set of wear-leveling data may include establishing a ranking of the different components of a host based on usage levels. Such a ranking may facilitate pairing of assets and hosts during determination of the placement arrangement. In embodiments, analyzing the set of wear-leveling data may include investigating the rate of usage of one or more components over time (e.g., as opposed to absolute usage values up to a single point in time). The amount of usage of a particular component may be broken down to represent the average usage per day, per week, per month, year, or entire usage lifespan. Accordingly, consideration of the rate of wear-leveling may allow for more accurate placement of assets. Other methods of analyzing the wear-leveling data are also possible.

In embodiments, determining the placement arrangement for the set of assets may include evaluating the set of assets with respect to the set of wear-leveling data at block 440. Evaluating the set of assets may include assessing the resource requirements of each asset and other asset-specific conditions that may influence the placement of the assets on the set of hosts. For example, evaluating the resource requirements of an asset may include assessing a historical utilization record of computing resources, and determining the type, frequency, and amount of resources used by a particular asset. In embodiments, evaluating the resource requirements of the asset may include establishing a resource usage profile for each asset that includes information regarding the resources required by the asset in different usage scenarios. As an example, a particular asset may not require significant memory resources under normal operation, but memory requirements may greatly increase relative to other resources during heavy operation. Accordingly, data regarding different usage scenarios may be included in the resource usage profile for each asset. In embodiments, the resource usage profile may be used during placement determination of the set of assets.

At block 450, the set of assets may be placed with respect to the set of hosts. Placing the set of assets may be based on the placement arrangement determined at block 430. Generally, placing the set of assets may include allocating, assigning, or designating one or more assets of the set of assets for deployment on a particular host of the set of hosts. As described herein, placement of the set of assets may be based on the wear levels of the group of components of each host as well as the operational priority of the assets. Example placement arrangements may prioritize placement of assets on hosts that include components having relatively low wear scores that match the operational priority of the asset (e.g., assets that prioritize storage may be placed on hosts that have relatively low storage component wear scores). Other methods of placing the set of assets are also possible.

Figure 5:
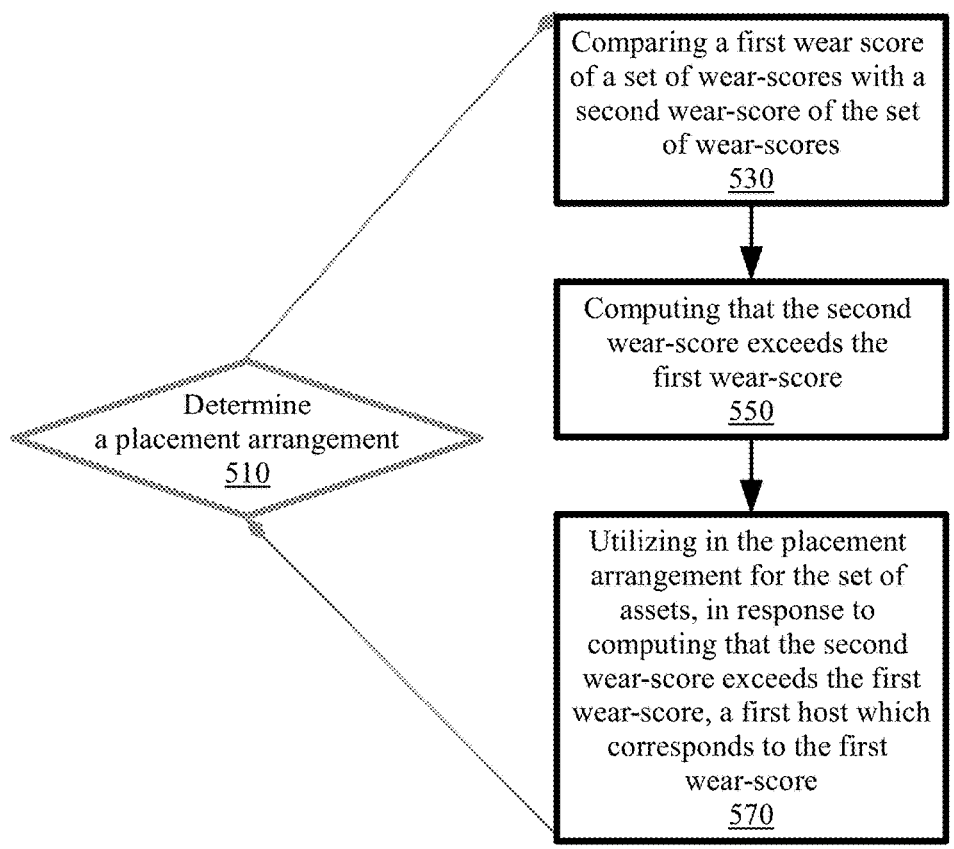
FIG. 5 is a flowchart illustrating a method for determining asset placement based on a set of wear scores, according to embodiments.

As described herein, determination of the placement arrangement of the set of assets with respect to the set of hosts may be performed in one of a number of ways. Aspects of FIG. 5 are directed toward a method 500 for determining asset placement based on a set of wear scores. Determining block 510 may include a comparing block 530, a computing block 550, and a utilizing block 570. Other blocks besides those shown explicitly herein are also possible.

As shown in FIG. 5, determining the placement arrangement for the set of assets with respect to the set of hosts may include comparing a first wear score of the set of wear scores with a second wear score of the set of wear scores at block 530. The wear scores may indicate a set of historical utilization ages (e.g., of the group of components of the set of hosts). As described herein, the wear scores may be a quantitative representation (e.g., numerical value) of the level of usage of one or more components of a host of the set of hosts. The placement arrangement may be determined by a comparison of wear scores between different hosts (e.g., composite wear scores) or components of different hosts (e.g., individual wear scores). The first wear score may correspond to a first component of the first host, and the second wear score may correspond to a first component of a second host. In embodiments, the comparison may be performed between like components of two different hosts (e.g., both the first component of the first host and the first component of the second host may be storage devices).

Consider, for example, a scenario in which a first host has a memory component with a wear score of 23, and a second host has a memory component with a wear score of 31. The wear scores of each memory component may be compared, and at computing block 550 it may be computed that the second wear-score exceeds the first wear-score (e.g., 31 is greater than 23). Accordingly, in response to computing that the second wear-score exceeds the first wear-score, utilizing block 570 may determine to utilize the first host which corresponds to the first wear score in the placement arrangement for the set of assets (e.g., choosing the host with the lesser wear score for the memory component may provide a longer service life than a host with a greater wear level).

In certain embodiments, the set of assets may include a first asset which has an operational priority related to the first component. Generally, the operational priority may be a preference, order, or rank of the degree of importance of one or more computing resources (e.g., processing, memory, storage, i/o) with respect to a particular asset. For instance, a given asset may be processor intensive, and thus it may be desirable to prioritize placement of this asset on a host device that can satisfy the CPU requirements of the asset. In embodiments, a particular asset may have an operational priority that includes multiple computing resources, ranked in terms of which resource is of greater priority. For instance, an asset may have an operational priority in which memory is first priority, CPU is second priority, i/o is third priority, and storage is fourth priority. As described herein, the operational priority of an asset may be used in combination with the wear scores of the group of components of a host to determine the placement arrangement. Other methods of determining the placement arrangement are also possible.

Figure 6:
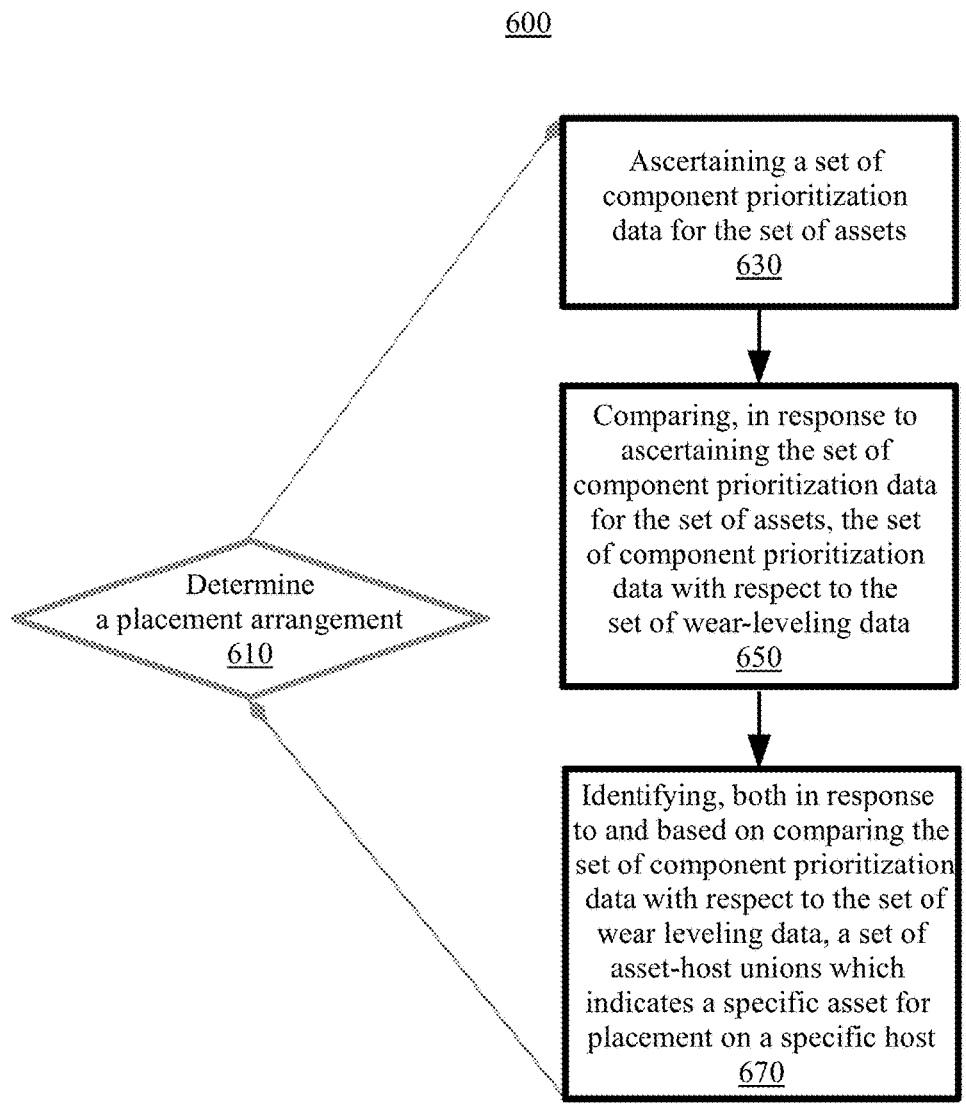
FIG. 6 depicts a method for determining a placement arrangement for a set of assets based on component prioritization, according to embodiments.

Aspects of FIG. 6 are directed toward a method 600 for determining a placement arrangements for a set of assets based on a set of component prioritization data for the set of assets and a set of wear-leveling data for the set of hosts. FIG. 6 may include a determining block 610, an ascertaining block 630, a comparing block 650, and an identifying block 670. Other blocks besides those described specifically herein are also possible. In embodiments, determining block 610 may include ascertaining block 630, comparing block 650, and identifying block 670.

In embodiments, block 630 may be configured to ascertain a set of component prioritization data for the set of assets. Generally, the component prioritization data may be data that indicates a preference or ranking of the degree of importance of each component with respect to a particular asset. In embodiments, the component prioritization data for a particular asset may be ascertained based on an evaluation of historical utilization data or a resource utilization profile (e.g., as illustrated at block 440 of FIG. 4). The historical utilization data may be analyzed to determine which resources are most required by a particular asset, and the components that provide those resources may be given higher priority. As an example, a particular asset may be configured to run finite element analysis (FEA) software for engineering design. Based on the resource utilization profile, it may be ascertained that running the FEA software is processor intensive, with heavy demands placed on memory resources as well. Storage space for maintaining the FEA models may also be moderately required. Accordingly, in embodiments, component prioritization data for the asset may rank CPU as the greatest priority (e.g., based on the processing resource demands), with RAM as the second priority and disk storage devices as the third priority. Other methods of ascertaining component prioritization data for the set of assets is also possible.

In response to ascertaining the set of component prioritization data for the set of assets, at block 650 the component prioritization data may be compared with the set of wear-leveling data. Comparing the component prioritization data with the set of wear-leveling data may include examining the wear scores of each host of the set of hosts to find a compatible match for each asset based on the component prioritization for that asset. In embodiments, example matches may include placement of a particular asset on a host that has low wear scores for the components that the particular asset highly prioritizes. Accordingly, such a configuration may be associated with extended asset and component life-spans as well as performance and efficiency benefits. Other methods of comparing the component prioritization data with the set of wear-leveling data are also possible.

At block 670, based on the comparison between the component prioritization data and the set of wear-leveling data, a set of asset-host unions may be identified. The asset-host unions may be a match, combination, or other grouping of a host and one or more assets that indicates placement of a specific asset on a specific host. As described herein, example asset-host unions may prioritize placement of assets on hosts that have relatively low wear scores. Consider the following example. A particular asset may be configured to handle data backup operations, and prioritize storage capacity followed by I/O capabilities, processing capability, and memory, respectively. A first host may have wear scores of 46 for CPU, 29 for memory, 35 for storage devices, and 21 for I/O. A second host may have wear scores of 51 for CPU, 30 for memory, 22 for storage devices, and 18 for I/O. Accordingly, as the second host has lower wear scores for storage devices and I/O (e.g., the components/ resources most highly prioritized by the asset) a host-asset union between the second host and the asset may be identified. Other methods of identifying the host-asset unions are also possible.

Figure 7:
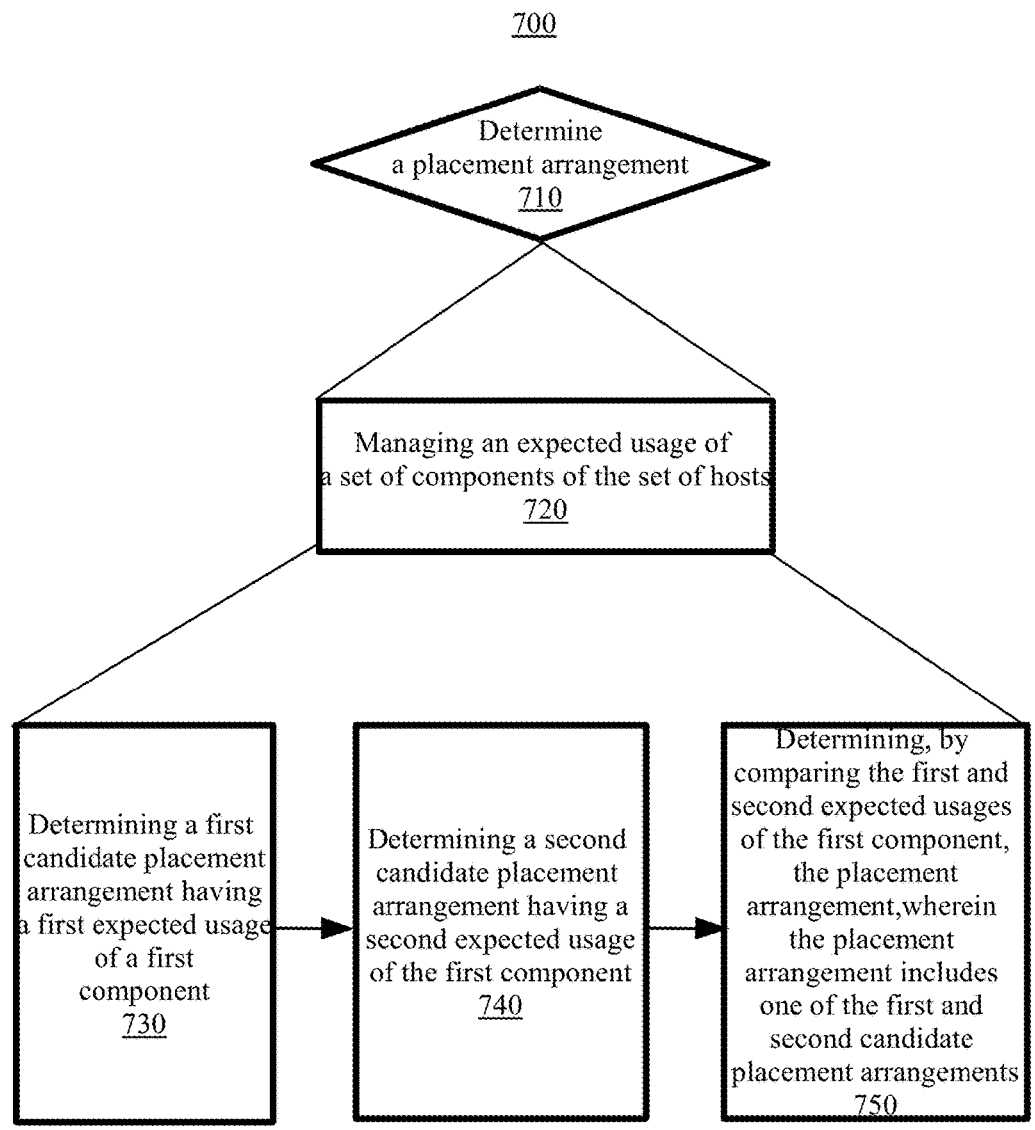
FIG. 7 depicts a method for determining a placement arrangement based on expected component usage, according to embodiments.

FIG. 7 depicts a method 700 for determining a placement arrangement based on expected component usage. Aspects of FIG. 7 are directed toward determining a first and a second candidate placement arrangement using expected component usage. The method 700 may include a first determining block 710, a managing block 720, a second determining block 730, a third determining block 740, and a fourth determining block 450. As described herein, aspects of the disclosure may be directed toward determining a placement arrangement for a set of assets on a set of hosts. In embodiments, the first determining block 710 may include managing block 720, the second determining block 730, the third determining block 740, and the fourth determining block 750.

At block 720, an expected usage of a set of components of the set of hosts can be managed. The expected usage may be a prediction of the degree to which the set of components will be utilized by the set of assets in a given placement arrangement. In embodiments, the expected usage may be calculated based on historical utilization records for the set of assets in previous placement arrangements. If historical utilization records for the set of assets are not available, the expected usage may be calculated based on hardware architecture data for the set of assets (e.g., the amount of resources to be used by a given asset may be predicted based on the hardware components of the asset). In embodiments, the expected usage may be expressed as a rate of resource usage per a specified time frame. As an example, the expected usage may specify that, in a particular placement arrangement, an asset to be placed on a given host is predicted to require 10 gigabytes of storage space per 24 hour period. In embodiments, the expected usage may be expressed as a percent of the total available resources of a particular component per a specified time period. For instance, the expected usage may specify that 30% of available processing resources, 20% of available memory resources, and 12% of available storage resources will be used by the asset in a period of a week. Other methods of expressing the expected usage of the set of components are also possible.

In various embodiments, managing the expected usage of the set of components of the set of hosts may include determining a first candidate placement arrangement having a first expected usage of a first component at block 730. Generally, the candidate placement arrangement may be a potential arrangement of the set of assets on the set of hosts. For instance, the candidate placement arrangement may be a model or simulation used to evaluate the suitability of a particular asset for a particular host with regards to resource usage, component compatibility, and the like. Determining the first candidate placement arrangement may be based on a preliminary compatibility evaluation that indicates theoretical suitability between the asset and the host (e.g., based on expected resource usage, wear level data). As described herein, the candidate placement arrangement may have a first expected usage of a first component. The first expected usage of the first component may be an indication of the amount of the component's resources that will be used if the asset is placed on the host. As an example, the first candidate placement arrangement may include simulating placement of a first asset on a first host. In the first candidate placement arrangement, the first asset may have an expected usage of 44% of the CPU of the first host.

In various embodiments, a second candidate placement arrangement having a second expected usage of the first component may be determined at block 740. The second candidate placement arrangement may be a model or simulation used to evaluate an alternate placement arrangement scenario (e.g., different from the first candidate placement arrangement). The second candidate placement arrangement may be simulated in a number of ways. For instance, in certain embodiments, the second placement arrangement may include simulating placement of the first asset on a second host. In certain embodiments, the second placement arrangement may include simulating placement of a second asset on the first host and evaluating resource usage and component compatibility. For example, as described herein, the second candidate placement arrangement may include simulating placement of a second asset on the first host. In the second placement arrangement, the second asset may have an expected usage of 38% of the CPU of the first host.

In various embodiments, the placement arrangement may be determined by comparing the first candidate placement arrangement and the second candidate placement arrangement with respect to expected component usage at block 750. In embodiments, determining the placement arrangement may include selecting either the first or the second candidate placement arrangement based on the expected usage of first component. For instance, in certain embodiments the placement arrangement may include selecting the candidate placement arrangement that has the lesser expected usage of the first component (e.g., lesser expected usage may be associated with benefits such as longer component life, performance and efficiency). As an example, referring to the example referenced herein, at block 750 the method 700 may include comparing the first candidate placement arrangement (e.g., having an expected usage of 44% of the CPU of the first host) with the second candidate placement arrangement (e.g., having an expected usage of 38% of the CPU of the first host). Accordingly, as the second candidate placement arrangement has a lesser expected usage of the CPU, it may be selected as the placement arrangement. Other methods of comparing candidate placement arrangements and determining the placement arrangement are also possible.

In embodiments, the candidate placement arrangements may include expected usages for multiple components. For instance, the first candidate placement arrangement may have a first expected usage of a second component, and the second candidate placement arrangement may have a second expected usage of the second component. Consider the following example. The first candidate placement arrangement may simulate placement of a first asset on a first host. In the first candidate placement arrangement, the first asset may an expected usage of 54% of the memory component of the first host, and an expected usage of 37% of the storage component of the first host. In the second candidate placement arrangement, the second asset may have an expected usage of 54% of the memory component of the first host, and an expected usage of 73% of the storage component of the first host. As described herein, determining the placement arrangement may include comparing the expected usages of the first candidate placement arrangement and the second candidate placement arrangement.

Aspects of the disclosure relate to the recognition that, in certain embodiments, comparison of the expected usages of the first component may not yield conclusive results. For instance, as in the present example, the expected usages of the memory component in both the first and second candidate placement arrangements are substantially similar, and the placement arrangement may not be determinable based on the first component expected usage alone. Accordingly, in such scenarios, aspects of the disclosure are directed toward comparing the first and second expected usages of the second component. For instance, in the present example, as the expected usage of the memory component in both the first and second candidate placement arrangements is substantially similar, the expected usage of the storage component may be compared. Accordingly, as the expected usage of the storage component is 37% in the first candidate placement arrangement and 73% in the second candidate placement arrangement, in certain embodiments the first candidate placement arrangement may be selected as the placement arrangement. Other methods of comparing candidate placement arrangements and determining the placement arrangement are also possible.

Figure 8:
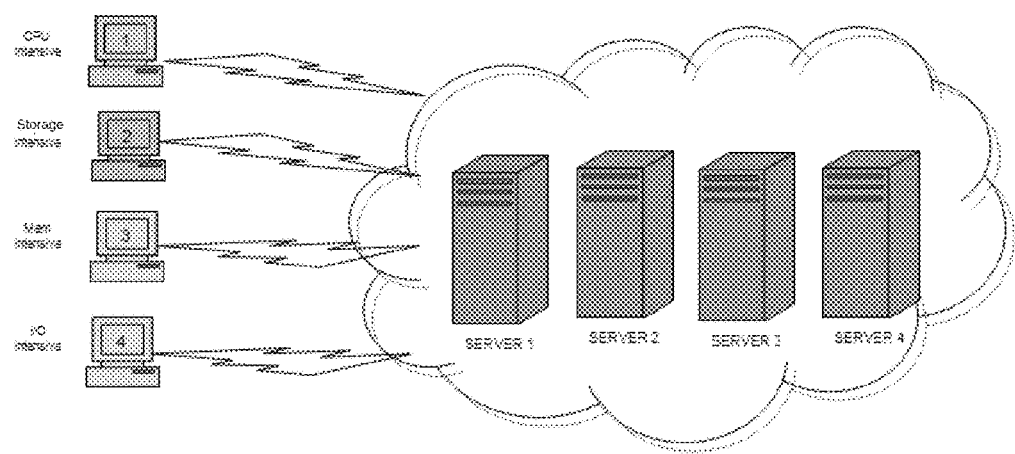
FIG. 8 depicts an example network architecture for placement of a set of virtual machines on a set of hosts, according to embodiments.

FIG. 8 depicts an example network architecture 800 for placement of a set of virtual machines on a set of hosts, according to embodiments. Aspects of FIG. 8, in certain embodiments, are directed toward a network including a set of virtual machines configured to be placed on a set of servers based on wear-leveling data for the set of servers. Placement of the set of virtual machines on the set of servers may also be based on component prioritization data of the set of virtual machines (VMs). For instance, in embodiments, one or more of the set of virtual machines may have a first priority for one or more types of computing resources. Accordingly, as shown in FIG. 8, VM 1 may prioritize processing resources, VM 2 may prioritize storage resources, VM 3 may prioritize memory resources, and VM 4 may prioritize I/O resources. As described herein, aspects of the disclosure are directed toward determining a placement arrangement for the set of virtual machines based both on the respective component prioritization data of the VM and wear-leveling data for the set of servers. Wear-leveling data may be collected for Server 1, Server 2, Server 3, and Server 4 using one or more of the techniques described herein (e.g., detecting, retrieving, computing).

FIG. 9 depicts an example wear-leveling data set in Table 910A and an example component prioritization data set for a subset of virtual machines in Table 910B. As shown in Table 910A, each component of each server of the set of servers may be evaluated and assigned a wear-score. In embodiments, the wear-score may be computed based on past utilization history, and higher wear scores may indicate greater levels of usage for the component to which they are assigned (e.g., lower usage and thus lower wear levels may be desirable for placement of virtual machines). Table 910B depicts a candidate placement arrangement for two virtual machines based on their respective component prioritization data and the wear-leveling data for the set of available hosts.

Consider the following scenario. As shown in FIG. 8, a particular cloud environment includes four host servers and four virtual machines seeking placement. Each virtual machine may have a component prioritization. As described herein, VM 1 may prioritize processing resources, VM 2 may prioritize storage resources, VM 3 may prioritize memory resources, and VM 4 may prioritize I/O resources. Aspects of the disclosure are directed toward determining a placement arrangement for the set of virtual machines such that the virtual machines are matched with hosts that have substantially low wear scores with respect to the resources prioritized by the virtual machines. Table 910A indicates the wear leveling data for each server depicted in FIG. 8. In embodiments, as shown in Table 910A, Server 1 may be determined as a desirable host for virtual machines that prioritize processing resources, as its wear score is 10, the lowest of the four servers. Similarly, Server 2 may be determined as a desirable host for virtual machines that prioritize I/O, and Server 3 may be preferable for storage intensive VMs.

Aspects of the disclosure relate to the recognition that, in certain situations, multiple servers may be tied for the lowest wear score with respect to a particular resource. For instance, referring to the example above, both Server 1 and Server 4 may be tied for the lowest wear score with respect to memory. Accordingly, in certain embodiments, a second priority resource may be considered to decide between the two servers. For example, as shown in Table 910B, the resource that VM 1 prioritizes next after memory is I/O. With respect to I/O, as Server 4 has a wear score of 40 and Server 1 has a wear score of 50, Server 4 may be chosen as the host for VM 1. Similarly, Server 3 may be selected as a suitable host for VM 2 as it has the lowest wear score with respect to storage. Other methods of determining placement arrangements for the set of virtual machines and the set of hosts are also possible.

Aspects of the disclosure, in certain embodiments, are directed toward metering use of the placement arrangement. Metering use of the placement arrangement may include tracking, documenting, recording, or calculating the degree of utilization of the placement arrangement. The degree of utilization of the placement arrangement may be expressed in terms of time (e.g., 500 hours, 4 months, 2 years), resource usage (e.g., number of assets placed on hosts, amount of data processed) or other means. Based on the metered use, the present disclosure may include generating an invoice. The invoice may include a bill, fee, service charge, or other itemized breakdown specifying compensation for the usage of the placement arrangement. Subscription based models are also possible.

Figure 10:
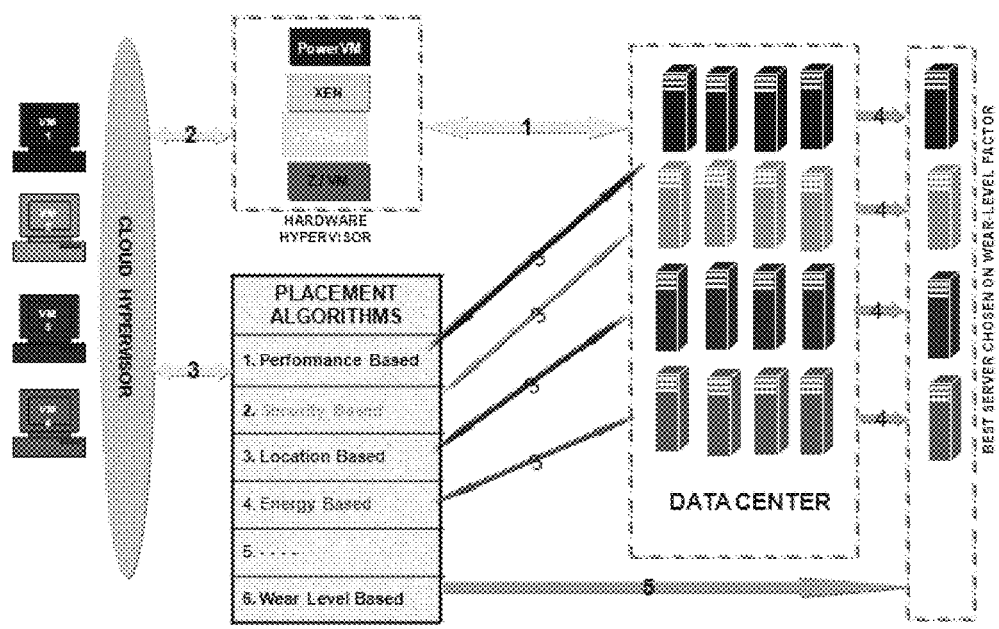
FIG. 10 depicts an example network architecture for managing asset placement according to embodiments.

FIG. 10 depicts an example network architecture 1000 for managing placement of virtual machines. As described herein, aspects of FIG. 10 are directed toward collecting wear-leveling data for each resource, and maintaining the wear-leveling data in a portion of a hardware hypervisor which is accessible by a cloud hypervisor. The cloud hypervisor may detect and update a hardware utilization database periodically based on the server hypervisor data. Assets may be selected for deployment on hosts based on one or more placement arrangement techniques. For instance, in certain embodiments wear-leveling data can be used in combination with other placement techniques such as security-based placement techniques, energy based placement techniques, performance based placement techniques, location based placement techniques, or the like. Other methods of determining placement arrangements for the set of virtual machines are also possible.

As described herein, aspects of the present disclosure are directed toward detecting a set of wear-leveling data for use in determining a placement arrangement of a set of assets (e.g., virtual machines) on a set of hosts. Detecting the set of wear-leveling data may be performed in one of a number of ways, including retrieving host-specific usage data from individual hosts or computing the wear-leveling data based on historical utilization information. Aspects of the disclosure, in certain embodiments, are directed toward a system and method for determining the wear-leveling data based on system bus traffic across microprocessor architecture.

Figure 11:
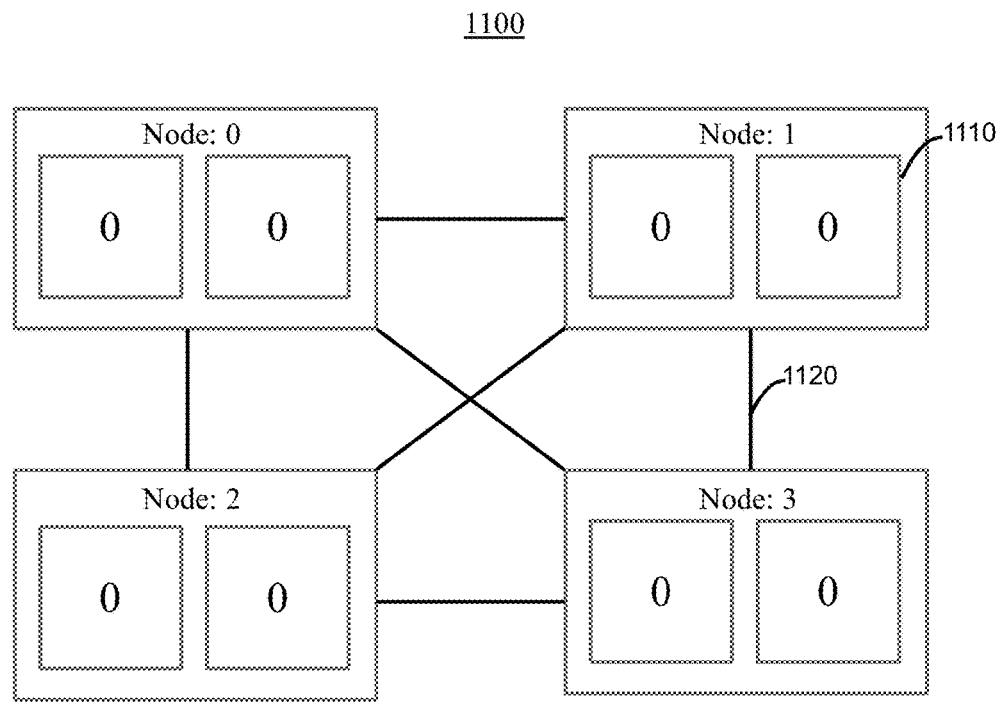
FIG. 11 is a diagram illustrating an example high-level hardware architecture of a server environment, according to embodiments.

FIG. 11 is a diagram illustrating an example high-level hardware architecture of a server environment. As shown in FIG. 11, the server environment may include a set of compute nodes 1100, a set of processor modules 1110, and a system bus 1120. Generally, the set of compute nodes 1100 may include connection points, redistribution points, or other active components (physical or virtual) configured to create, receive, or transmit information over a communications channel. In embodiments, the set of compute nodes may include sockets (e.g., an endpoint of a multi-channel communication link between multiple programs running on a network) of a network server. As shown in FIG. 11, each node of the sever environment may be connected to other nodes of the server environment via bus 1120. The bus may be a communication system configured to transfer data between components of the hardware architecture (e.g., compute nodes). In embodiments, the bus may include a system bus, and the other hardware components may include one or more memory devices. As an example, the system bus may be configured to transfer read/write requests between nodes of the set of compute nodes. In certain embodiments, the bus may not be a system bus, and the computer hardware component may include a peripheral device (e.g., auxiliary device such as a printer, mouse, keyboard, or the like).

In embodiments, each node of the set of compute nodes may include one or more processor modules 1110 (e.g., for purposes of illustration two processor modules are shown per node in FIG. 11). Aspects of the disclosure, in certain embodiments, are directed toward prioritizing placement of assets (e.g., virtual machines, processing threads) on lesser used processor modules. Accordingly, additional aspects of the disclosure are directed toward assessing the traffic of the system bus to evaluate and determine the wear level (e.g., degree of usage) of the set of compute nodes 1100.

Figure 12:
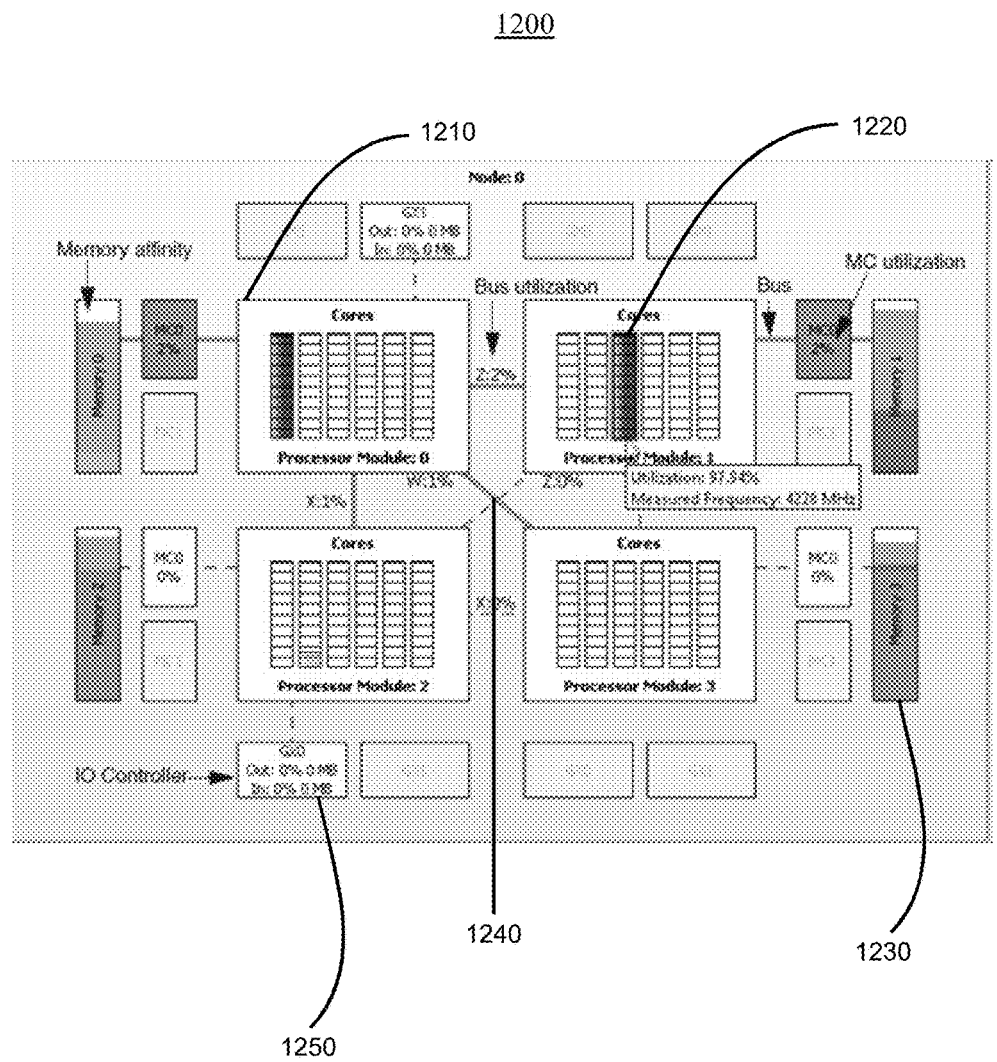
FIG. 12 is a diagram illustrating an example hardware architecture of an individual compute node of the set of compute nodes, according to embodiments.

FIG. 12 is a diagram illustrating an example hardware architecture of an individual compute node 1200 of the set of compute nodes. As described herein, each compute node of the set of compute nodes may include one more processor modules. For example, as shown in FIG. 12, compute node 1200 may include four processor modules 1210. In embodiments, each processor module may include one or more processing cores 1220 configured to read and execute program instructions. The degree of utilization of each core at a particular time is represented by the columns within each core. As shown in FIG. 12, memory controllers 1230 and I/O controllers 1250 may be connected to the processor modules via the system bus 1240.

Aspects of the present disclosure are directed toward monitoring and analyzing the degree of utilization of the set of compute nodes. Accordingly, as shown in FIG. 12, information regarding the utilization level of each system bus connection (e.g., bus traffic between processor modules and associated local memory), memory controller, I/O controller, and processor module core may be collected and used to facilitate determination of the wear level of each compute node. As an example, as shown in FIG. 12, memory controller 1230 is locally coupled with processor module 3. The wear level of memory controller 1230 DIMM (dual inline memory module) can be determined based on the overall number and frequency of read/write requested being passed through the system bus connection between memory controller 1230 and processor module 3. Other methods of determining the wear-level are also possible.

Figure 13:
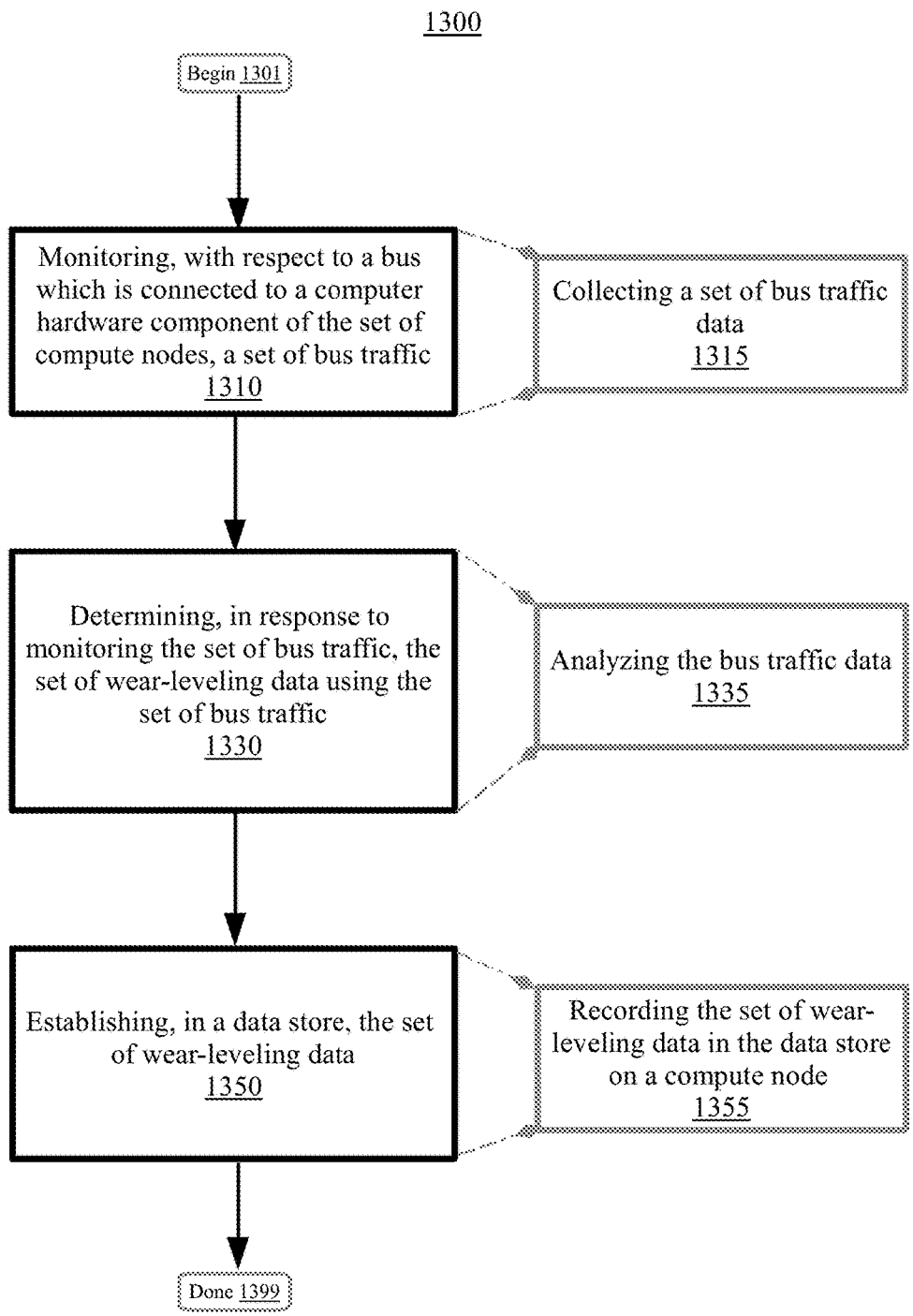
FIG. 13 is a flowchart illustrating a method of determining wear-leveling data based on a set of bus traffic, according to embodiments.

FIG. 13 is a flowchart illustrating a method 1300 of determining wear-leveling data based on system bus traffic, according to embodiments. As described herein, the wear-leveling data may be used for determining a placement configuration for deployment of an asset on a host. Illustrative placement initiatives can include efficient resource utilization on individual hosts or load balancing among hosts (e.g., for performance benefits). Method 1300 may begin at block 1301. As shown in FIG. 13, method 1300 may include a monitoring block 1310, a collecting block 1315, a determining block 1330, an analyzing block 1335, an establishing block 1350, and a recording block 1355. In embodiments, a set of assets (to be placed) includes a set of virtual machines. Other assets, such as various software applications, are also contemplated.

At block 1310, a set of bus traffic of a set of compute nodes may be monitored. As described herein, the set of compute nodes may include physical or virtual connection points for network traffic on a server. The set of compute nodes may be connected to other compute nodes on the network as well as other hardware components of the server via a system bus. The system bus may be configured to manage and direct a set of bus traffic between the various compute nodes and other hardware components of the server. The set of bus traffic may include read/write requests, network protocols, program instructions, and other data transferred between hardware components. Aspects of the disclosure are directed toward monitoring and assessing the set of bus traffic to evaluate the wear-level of the set of compute nodes and other hardware components of the server. Generally, monitoring the set of bus traffic may include scanning, surveying, tracking, recording, or otherwise observing the set of bus traffic. For instance, monitoring may include calculating the number of read/write requests executed by a particular compute node of the set of compute nodes. Other methods of monitoring the set of bus traffic are also possible.

In embodiments, monitoring the set of compute nodes may include collecting a set of bus traffic data at block 1315. As described herein, the set of bus traffic data may include read/write requests, network protocols, program instructions, and other data transferred between hardware components via the system bus. Generally, collecting the set of bus traffic data may include gathering, computing, aggregating, counting, measuring or otherwise acquiring information related to the degree of utilization of the system bus. In embodiments, collecting the set of bus traffic data may include using a hardware counter to compute the number of read and write requests processed by the system bus. As an example, each memory controller may be equipped with a register configured to track and record the number of read and write requests passed by the system bus to the processor module. As another example, collecting the set of bus traffic may include periodically running a diagnostic tool to calculate the number of read and write requests performed by a particular processor module until that point in time. Other methods of collecting the set of bus traffic data are also possible.

At block 1330, in response to monitoring the set of bus traffic, the set of wear-leveling data may be determined based on the set of bus traffic. As described herein, the wear-level of a given processor module may be calculated based on the number of read and write requests passed through the system bus, as monitored at block 1310. In embodiments, the set of wear-leveling data may include a set of wear scores that indicate a set of historical utilization ages. The historical utilization ages may be a measure that indicates the period/length of time a particular component has been used (e.g., expressed in hours, days, weeks, or the like). Determining the wear-leveling data based on the set of bus traffic may include using one or more algorithms or techniques to assign a quantitative index to each processor module that indicates the relative degree of usage of that component. For instance, the wear-level may include an integer value between 0 and 100, where lesser values (e.g., 13) represent little wear, and greater values (e.g., 86) represent greater wear. Lesser wear scores may be associated with lower likelihoods of hardware failure, extended component life spans, and efficiency. Other methods of determining and expressing wear-leveling are also possible.

In embodiments, determining the set of wear-leveling data may include analyzing the bus traffic data with respect to either usage frequency or usage intensity at block 1335. Generally, usage frequency may refer to the rate (e.g., absolute number per unit time) at which a read or write request is processed by a processor module, while usage intensity may refer to the degree or extent to which the processor module is taxed by a given read/write request. For instance, in certain embodiments, a first processor module may have a greater absolute number of processed read/write requests than a second processor module, however the read/write requests processed by the second processor module may have required significantly more processing resources to execute, resulting in more wear on the second processor module than the first (despite the lesser number). Accordingly, in certain embodiments, aspects of the disclosure relate to weighting the read/write requests based on their intensity when determining the set of wear-leveling data.

At block 1350, the set of wear-leveling data may be established in a data store. The data store may include random-access memory, databases, hard drives, solid state drives, storage devices, cloud-based storage, or other storage medium (either physical or virtual, volatile or non-volatile) for storing or encoding data and programs. Establishing the set of wear-leveling data may include creating a database, index, or other comprehensive, organized collection for main-taining the wear-leveling data for each processor module. In embodiments, the data store may be configured to be accessible either locally or remotely. Accordingly, at block 1355, establishing the set of wear leveling data in the data store may include recording the wear-leveling data on a local compute node. For instance, the local compute node may be part of the local network of the compute node from which the wear-leveling data was collected. In certain embodiments, establishing the set of wear-leveling data in the data store may include recording the wear-leveling data on a remote compute node that is physically separated from the compute node. For example, the remote compute node may be a server configured to act as a central storage device for aggregate wear-leveling data from multiple compute nodes on different networks. Other methods of establishing the set of wear-leveling data on a data store are also possible.

FIG. 14 depicts a table 1400 depicting an example set of utilization data (e.g., set of bus traffic) for a set of compute nodes of a server environment. The set of bus traffic of table 14 depicts the number of individual read and write requests for a server environment including four processor modules, four memory controllers, and four memory DIMMs. In embodiments, the set of bus traffic of table 14 may substantially correspond with the example hardware architecture of FIG. 12. As described herein, the set of bus traffic data (e.g., read and write request data) may be used to determine the wear-leveling data for the set of compute nodes. Consider the following example. A first asset may be designated for placement on one of the four processing modules. The first asset may be identified as a write-intensive asset, such that placement on a processor module with a low wear-level corresponding to write requests may be associated with benefits including longer component lifespan. Accordingly, in certain embodiments, the first asset may be determined to be placed on Processor Module 0, as it has performed the least number of over-all writes operations. Similarly, a second asset that is known to be read-intensive may be deter-mined to be placed on Processor Module 1, as it has processed the least number of overall read operations. Other assets that are not particularly read or write intensive may be placed based on an aggregate wear value that factors in both the read and write numbers for each processor module. Other methods of wear level calculation and asset placement are also possible.

Figure 15:
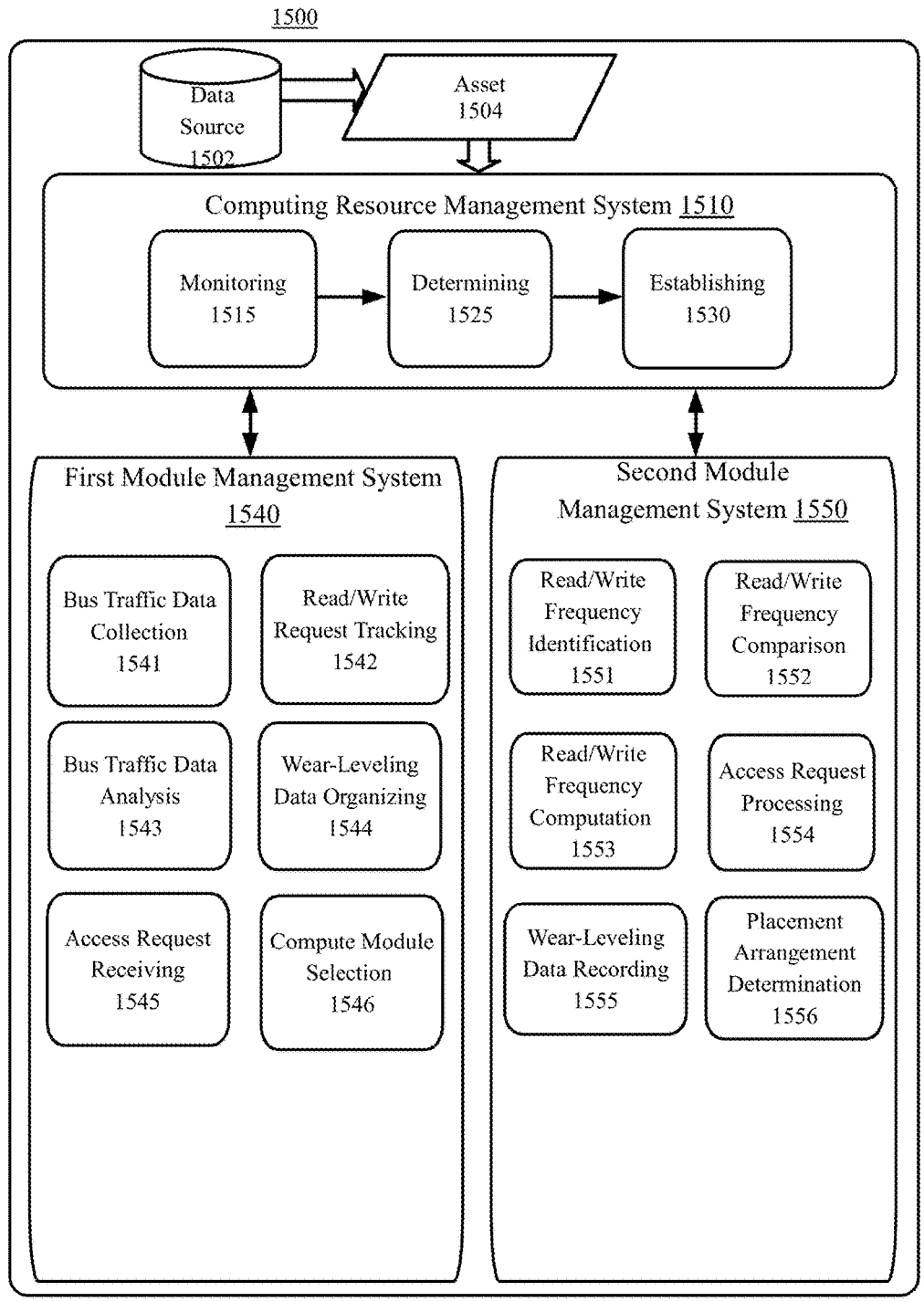
FIG. 15 depicts an example system architecture for implementing a method of managing asset placement based on a set of bus traffic, according to embodiments.

FIG. 15 depicts an example system architecture 1500 for implementing a method for managing asset placement based on system bus traffic. Aspects of the system architecture 1500 are directed toward calculating wear leveling data for a set of compute nodes based on system bus traffic (e.g., read/write requests) and determining placement for a set of assets on the set of compute nodes based on the wear leveling data. The system 1500 may include a data source 1502, an asset 1504, a computing resource management system 1510, a monitoring module 1515, a determining module 1525, an establishing module 1530, a first module management system 1540, a second module management system 1550, and a number of modules, sub-modules, and other operations configured to facilitate aspects of asset placement based on system bus traffic.

Aspects of the example system architecture 1500 are directed toward calculating wear leveling data for a set of compute nodes based on system bus traffic (e.g., read/write requests) and determining placement for a set of assets on the set of compute nodes based on the wear leveling data. As shown in FIG. 15, the example system architecture may include a data source 1502. The data source 1502 may include a database, storage device, computer network, cloud environment, or other data storage element. The system 1500 may also include an asset 1504. The asset 1504 may include a virtual machine, processing thread, data volume, workload, or other form of data. In embodiments, the asset 1504 may be configured to be maintained on the data source 1502.

In embodiments, the monitoring block 1515 of the computing resource management system 1510 may be configured to monitor and collect a set of bus traffic (e.g., read and write requests) of a set of compute nodes. The set of bus traffic may include read/write requests, network protocols, program instructions, or other data transferred between hardware components over the system bus. The monitoring block 1515 may be configured to track, record, count, or otherwise ascertain the number of read/write requests passed to each processor module by the system bus. As described herein, at determining block 1525 the computing resource management system 1510 may be configured to use the collected set of bus traffic to determine a set of wear-leveling data for the set of compute nodes. Determining the set of wear-leveling data for the set of compute nodes may include using one or more techniques or algorithms to assign a quantitative index to each compute node that indicates its degree of utilization. In embodiments, the wear-levels assigned to each compute node may be weighted based on the intensity of the commands requested by the set of bus traffic (e.g., more intensive requests may require more resources to process, thus putting more wear on the processing components). At establishing block 1530 the computing resource management system 1510 may include establishing the set of wear-leveling data in a data store. Establishing the set of wear-leveling data in a data store may include recording, storing, saving, or maintaining the wear-leveling data in a local or remote data storage system.

As described herein, aspects of the disclosure are directed toward determining a set of wear-leveling data for a set of compute nodes based on a set of bus traffic (e.g., system bus traffic). At block 1541 of the first module management system 1540, the set of bus traffic data can be collected. Collecting the set of bus traffic data may include gathering, computing, aggregating, counting, measuring or otherwise acquiring information related to the degree of utilization of the system bus. For instance, at block 1542, utilization of the system bus may be collected by tracking the number (e.g., frequency) of read requests and write requests transmitted to each processing module. Based on the collected set of bus traffic data, block 1543 may be configured to analyze the set of bus traffic. Analyzing the set of bus traffic may include examining, evaluating, or assessing the set of bus traffic to determine the degree of utilization of a processing module of a compute node. As described herein, the set of bus traffic may be weighted based on the intensity of the commands requested by the set of bus traffic (e.g., more intensive requests may require more resources to process, thus putting more wear on the processing components).

At block 1544, the first module management system 1540 may be configured to organize the set of wear-leveling data based on a lesser utilized hardware factor which indicates a lesser likelihood of a hardware error event. The lesser utilized hardware factor may be a flag, mark, tag, or other indicator that a particular hardware component has been utilized to a lesser degree relative to other hardware components on the network. Organizing the set of wear-leveling data may include sorting, ranking, arranging, or systematizing the wear-leveling data to prioritize usage of hardware components that have less utilized and have lower wear levels. As described herein, prioritization of lesser used hardware components may be associated with benefits such as reduced hardware error events.

At block 1545, an access request can be received. The access request may be a request for permission to perform a read or write operation to a particular file address. In embodiments, the access request may be received by a compute node of the set of compute nodes. At block 1546, in response to receiving the access request, the first module management system 1540 may be configured to select a first compute module (e.g., processing module) of the set of compute nodes to process the request. In embodiments, selecting the processing module may be determined based on the set of wear-leveling data. For example, in certain embodiments, the processing module with the lowest wear level (e.g., least amount of past utilization) may be selected for processing the access request. In embodiments, a processing module included within the compute node that received the access request may be selected to process the access request. In embodiments, a processing module included within another compute node connected to the first compute node via the system bus may be selected to process the access request. Other methods of selecting the processing module are also possible.

Aspects of the disclosure relate to the recognition that, in certain embodiments, the access request (e.g., read/write request) may be either a read intensive request or a write intensive request. Accordingly, at block 1551 of the second module management system 1550, aspects of the disclosure are directed toward identifying a first read frequency and a first write frequency for a first compute module (e.g., processing module) of the set of compute nodes. Generally, the first read frequency and the first write frequency may be a measure or count of the number of times the first processing module has performed a read operation or a write operation per a given time period (e.g., service lifetime, one year, one month), respectively. As an example, it may be identified that the first processing module has performed a total of 837 read operations and 266 write operations. As describe herein, the read frequency and write frequency may be determined based on an analysis of the collected wear-leveling data for each compute node. Block 1551 may then include identifying a second read frequency and a second write frequency for a second processing module. For instance, the second processing module may have a total read frequency of 598 and a write frequency of 331.

At block 1552, the first read/write frequency may be compared with the second read/write frequency. Comparing the read/write frequencies may include inspecting the first and second read frequencies with respect to one another, as well as the first and second write frequencies with respect to one another to ascertain which is greater. Accordingly, at block 1553, it may be computed that one of the read frequencies exceeds the other, and also that one of the write frequencies exceeds the other. As an example, referring once again to the example above, it may be determined that the read frequency of the first processing module exceeds the read frequency of the second processing module (e.g., 837 is greater than 598), and that the write frequency of the second processing module exceeds the write frequency of the first processing module (e.g., 331 is greater than 266).

At block 1554, the access request may be configured to by processed by one of the processing modules. As described herein, in certain embodiments, a read intensive request or a write intensive request may be configured to be processed by the processing module that has the lesser read frequency (e.g., in the case of a read intensive request) or the lesser write frequency (e.g., in the case of a write intensive request). Accordingly, referring once again to the example above, a read intensive request may be configured to be processed by the second processing module (e.g., as the second processing module has a lesser read frequency), while a write intensive request may be configured to be processed by the first processing module (e.g., as the first processing module has a lesser write frequency). Other methods of processing the access request are also possible.

At block 1555, the second module management system 1550 may include recording the set of wear-leveling data in a data store. The data store may include random-access memory, database, hard drives, solid state drives, storage devices, cloud-based storage, or other storage medium (either physical or virtual, volatile or non-volatile) for storing or encoding data and programs. In embodiments, the data store may be part of the local compute node from which the wear-leveling data was collected. In certain embodiments, the data store may be a remote server configured to act as a central storage device for aggregate wear-leveling data from multiple compute nodes on different networks. Other methods of establishing the set of wear-leveling data on a data store are also possible.

At block 1556, consistent with aspects described herein, a placement arrangement for a set of virtual machines may be determined. Generally, the placement arrangement may include a configuration for deployment of the set of virtual machines to a plurality of hosts (e.g., a set of compute nodes). An example placement arrangement may prioritize accommodation of assets to hosts that have lower wear levels (e.g., associated with longer remaining usage life spans). The placement arrangement for the set of virtual machines may be determined based on the wear-leveling data for the system bus of the set of compute nodes. Based on the placement arrangement, the set of virtual machines may be placed on the set of hosts. Placing the set of virtual machines may include allocating, assigning, deploying, or otherwise designating the virtual machines to the set of compute nodes. Other methods of determining the placement arrangement and placing the set of virtual machines are also possible.

As described herein, aspects of the present disclosure are directed toward detecting a set of wear-leveling data for use in determining a placement arrangement of a set of assets (e.g., virtual machines) on a set of hosts. Detecting the set of wear-leveling data may be performed in one of a number of ways, including retrieving host-specific usage data from individual hosts or computing the wear-leveling data based on historical utilization information. Aspects of the disclosure, in certain embodiments, are directed toward a system and method for determining the wear-leveling data based on processor core utilization.

In embodiments, the system and method described herein for determining wear-leveling data based on processor core utilization may be configured to operate in a server environment substantially similar to that depicted in FIG. 11-12. Referring once again to FIG. 11, the server environment may include a set of compute nodes 1100, a set of processor modules 1110, and a system bus 1120 communicatively connected to the set of compute nodes 1100. As shown in FIG. 11, in embodiments the server environment may include four processor modules with two cores per module. Each core may have different processing capabilities and utilization histories, resulting in different wear-levels for each core. Referring now to FIG. 12, an expanded diagram of an individual compute node 1200 is depicted. As described herein, compute node 1200 may include four processor modules 1210 connected by a system bus 1240. The processor modules may each include one or more processing cores 1220 configured to read and execute program instructions. The degree of CPU utilization of each core at a particular time is represented by the columns within each core. As described herein, aspects of the disclosure are directed toward using the CPU utilization of the set of cores to determine a set of wear-leveling data for each compute node, and determining an asset placement configuration for a set of virtual machines based on the set of wear leveling data. Placement of virtual machines and scheduling computing threads on lesser utilized processing modules may provide benefits associated with prolonged component lifespan, speed, and processing performance.

Figure 16:
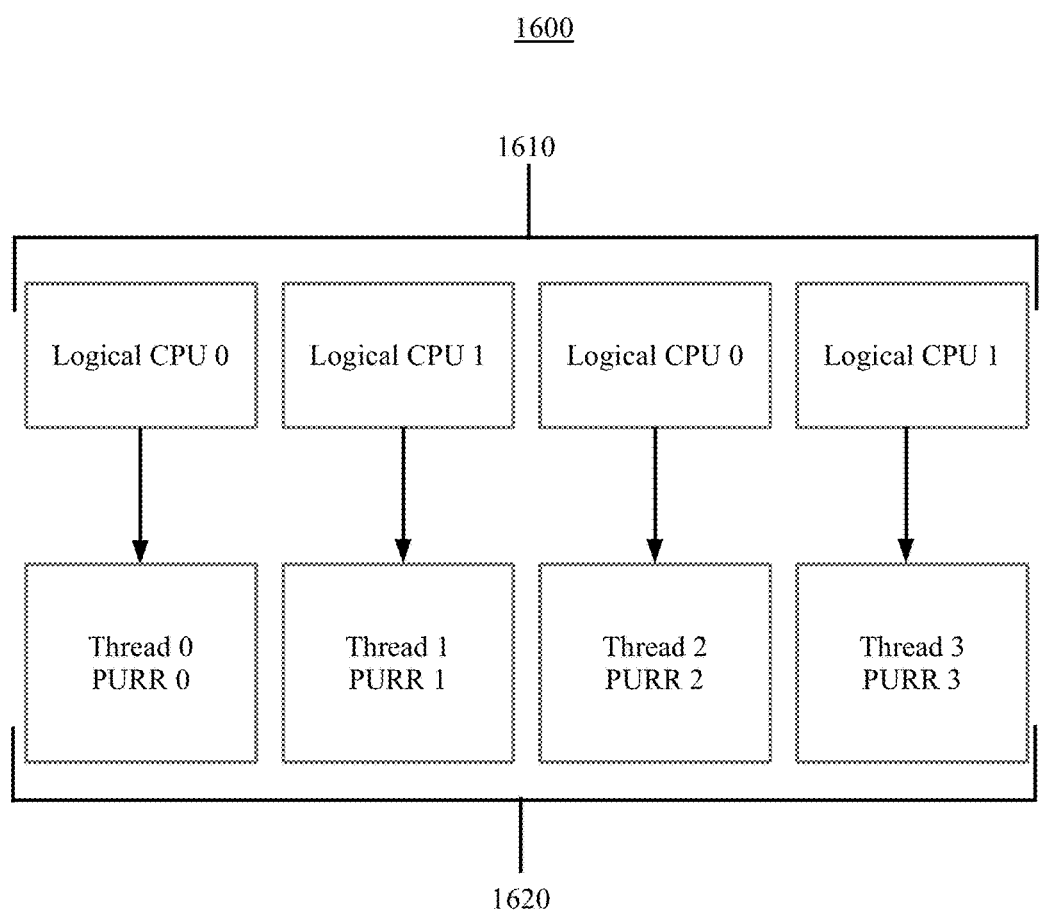
FIG. 16 depicts an example workload dispatch technique for a physical core, according to embodiments.

FIG. 16 depicts an example workload dispatch technique 1600 for a physical core (e.g., of a processing module on a compute node). As shown in FIG. 16, the workload dispatch technique 1600 may include a set of logical CPUs 1610. The set of logical CPUs may represent hardware threads of a physical core. In embodiments, the physical core may be configured to run multiple (e.g., four) threads at a time during a single execution cycle. As shown in FIG. 16, the workload dispatch technique 1600 may also include a set of processor utilization resource registers (PURRs). A PURR may include a type of register configured to calculate and track processor time and utilization in a simultaneous multithreading environment. In embodiments, the PURR may be configured to provide an actual count of physical processing time units utilized by a logical processor. In embodiments, a single PURR may correspond to a single hardware thread (e.g. Thread 0 corresponds to PURR 0, as shown in FIG. 16).

Figure 17:
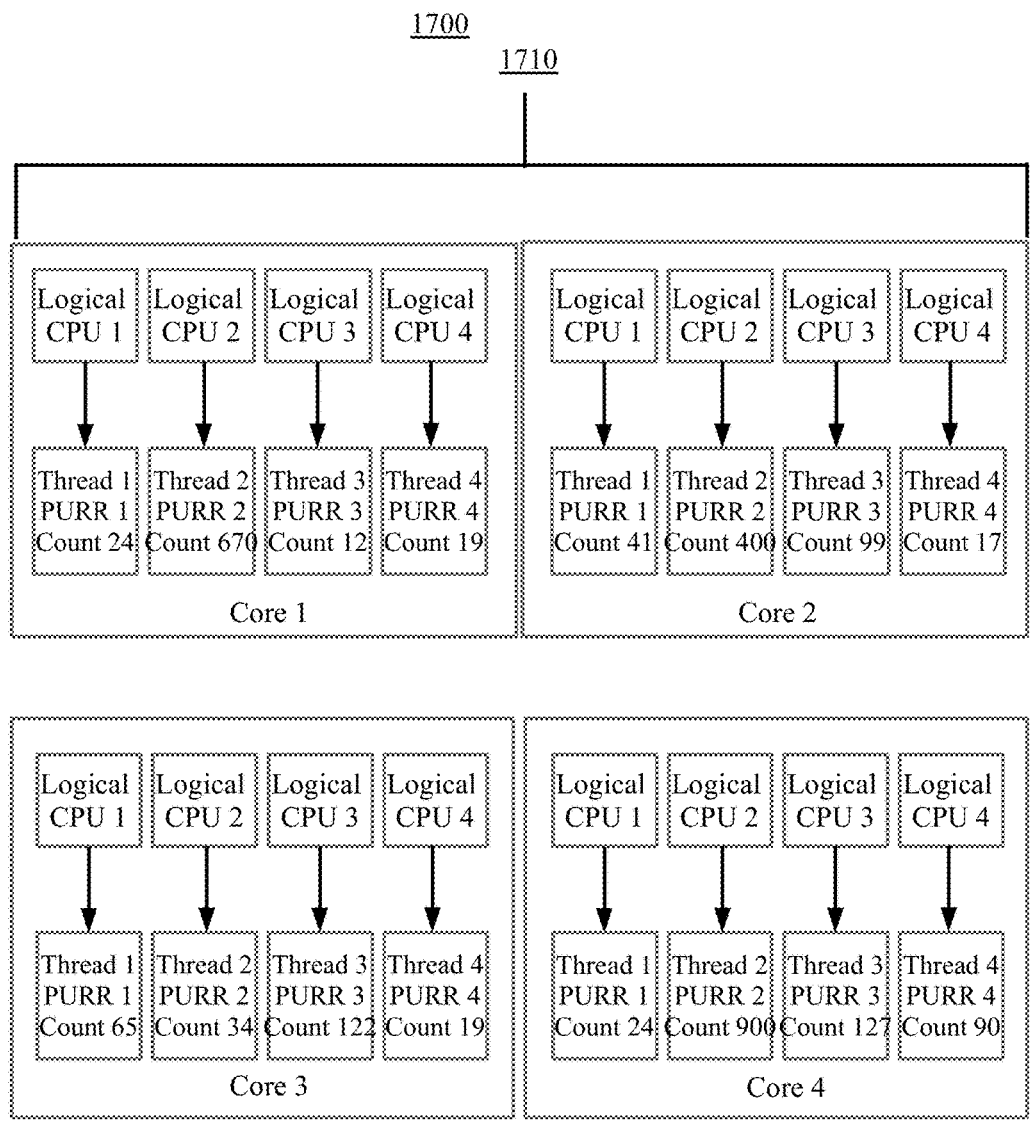
FIG. 17 illustrates an example usage scenario of a compute node, according to embodiments.

FIG. 17 illustrates an example usage scenario 1700 of a compute node. As shown in FIG. 17, the compute node may include four cores 1710, where each core includes four hardware threads. A unique PURR may correspond to each individual hardware thread, and be configured to monitor the processing activity and degree of usage of its corresponding hardware thread. In embodiments, the PURR may be configured to track (e.g., count) the number of jobs scheduled on a given hardware thread by the hypervisor. As an example, Logical CPU 3 of Core 2 may be determined to have a job count of 99, while Logical CPU 1 of Core 3 may have a job count of 65, as computed by each PURR respectively. Other methods of tracking the utilization of each core are also possible.

FIG. 18 illustrates an example utilization result 1800 for a compute node. As shown in FIG. 18, Table 1810 displays the PURR counts for each Logical CPU illustrated in FIG. 17. Generally, greater PURR values indicate that more threads have been scheduled on a given core. In embodiments, the utilization data for each core may be analyzed to determine an aggregate PURR count for each core. For instance, as shown in Table 1810, Core 4 has the greatest overall usage, while Core 3 has the least overall usage. As described herein, the job counts tracked by each PURR may be used to determine the set of wear-leveling data for the compute node. Other methods of determining the set of wear-leveling data are also possible.

Figure 19:
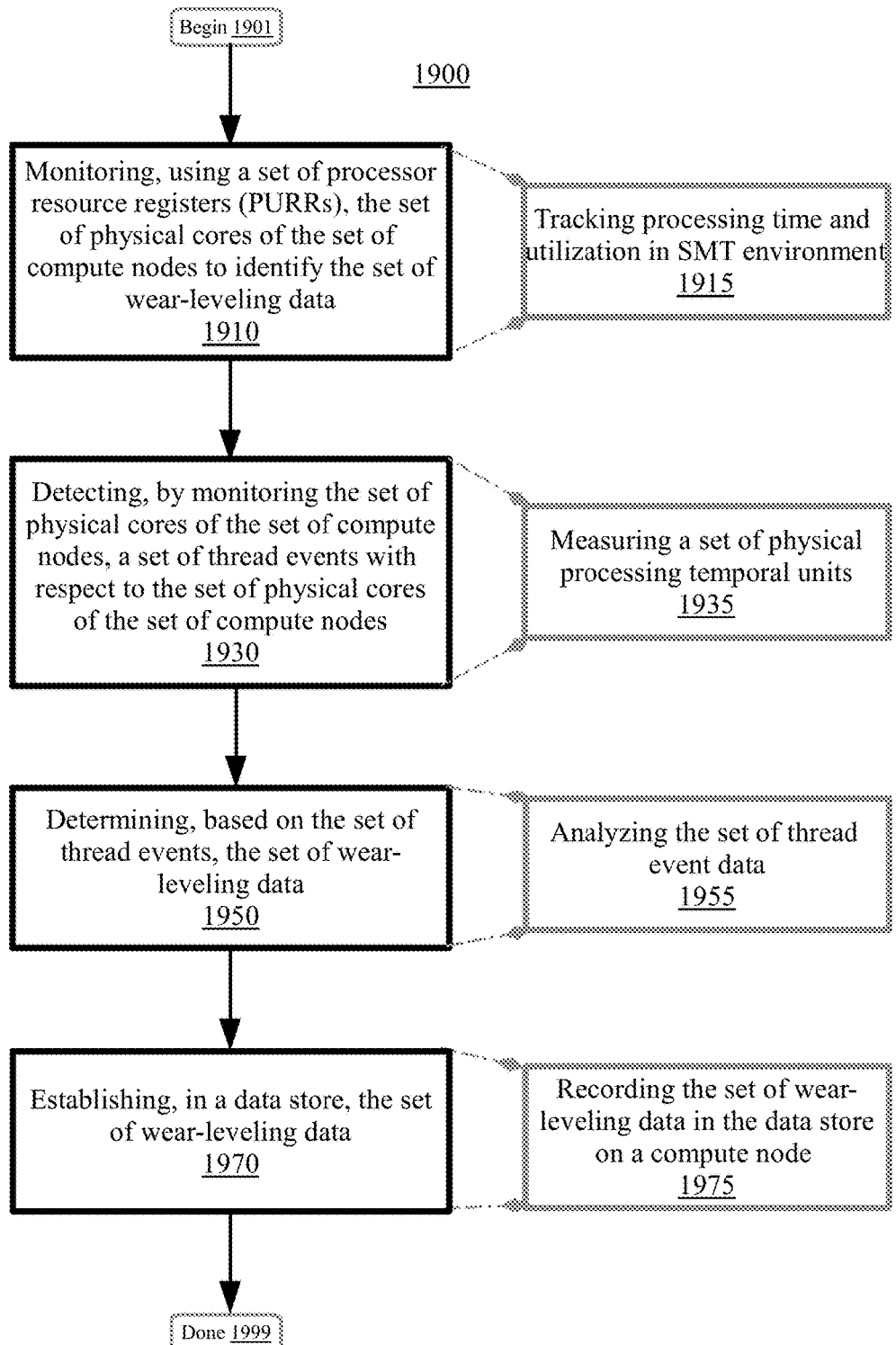
FIG. 19 depicts a flowchart illustrating a method for determining wear-leveling data based on processor utilization, according to embodiments.

FIG. 19 is a flowchart illustrating a method 1900 of determining wear-leveling data based on processor utilization, according to embodiments. As described herein, the wear-leveling data may be used for determining a placement configuration for deployment of an asset on a host. Illustrative placement initiatives can include efficient resource utilization on individual hosts or load balancing among hosts (e.g., for performance benefits). Method 1900 may begin at block 1901. As shown in FIG. 19, method 1900 may include a monitoring block 1910, a tracking block 1915, a detecting block 1930, a measuring block 1935, a determining block 1950, an analyzing block 1955, an establishing block 1970, and a recording block 1975. In embodiments, a set of assets (to be placed) includes a set of virtual machines. Other assets, such as various software applications, are also contemplated.

At block 1910, a set of physical cores (e.g., processing modules) of the set of compute nodes may be monitored to identify the set of wear-leveling data. As described herein, the set of compute nodes may include physical or virtual connection points for network traffic on a server. The set of compute nodes may be connected to other compute nodes on the network as well as other hardware components of the server via a system bus. Each compute node may include a set of physical cores. In embodiments, each core may include a number of hardware threads. Each hardware thread may be configured to manage a set of software threads. Generally, the set of software threads may include sequences of programmed instructions, jobs, or tasks configured for execution by the processing core. Aspects of the present disclosure, in embodiments, are directed toward monitoring the set of physical cores of the compute node to identify the degree of utilization of each core.

In embodiments, monitoring the set of physical cores may include tracking processing time and processor utilization at block 1915. In certain embodiments, the processing time and processor utilization may be tracked using a set of processor utilization resource registers (PURRs). As described herein, a PURR may include a type of register configured to calculate and track processor time and utilization in a simultaneous multi-threading (SMT) environment. In embodiments, a single PURR may correspond to a single hardware thread, and be configured to track (e.g., count) the number of jobs scheduled on a given hardware thread by the hypervisor. Tracking the number of jobs scheduled on a given hardware thread may also include monitoring the frequency (e.g., number of jobs per unit time) at which jobs are assigned to the hardware thread. Other statistics regarding job assignment (e.g., time at which the job is assigned, job type, completion time, average job count per given time) may also be calculated. As an example, the PURR may ascertain that, on average, a particular hardware thread is assigned 380 jobs in a one hour period. Other methods of tracking the utilization of the set of hardware threads are also possible.

At block 1930, by monitoring the set of physical cores of the set of compute nodes, a set of thread events may be detected with respect to the set of physical cores of the set of compute nodes. Generally, a thread event may include an action, occurrence, or other incident that relates to one or more of the hardware or software threads of the physical cores. For example, the thread events may include the assignment of a job to a thread, completion of a job, error event, thread transfer, or the like. In embodiments, the thread events may include the detection of a thread safety level. The thread safety level may be one or more states or conditions that indicate the degree to which a given job or portion of code is verified for operation in a multi-threading environment. For instance, in some situations, some jobs may be determined to have a low thread safety level, which indicates that simultaneous access by different threads may give rise to errors or race conditions. In certain embodiments, jobs may be determined to be conditionally safe, such that certain data portions are protected from race conditions and are safe for access by multiple threads simultaneously. In embodiments, other jobs may be determined to be thread safe (e.g., guaranteed to be free from race conditions when accessed by multiple threads simultaneously). Monitoring the set of thread events may provide additional utilization information regarding the physical cores that can be used to calculate the wear-leveling data.

In embodiments, a set of physical processing temporal units may be measured at block 1935. Generally, the physical processing temporal units may be units of time that indicate how long it takes for a particular job or portion of code takes to be processed by a physical processor (e.g., processor core, hardware thread). In embodiments, the physical processing temporal time units may be used to measure the time it takes for a job or thread event to reach completion, and may be tracked by the PURR assigned to each hardware thread. As an example, in embodiments, the PURR may measure the time it takes for the hardware thread to complete each job, and compile the completion time data for additional analysis. In embodiments, the PURR may calculate the average time taken by its corresponding hardware thread to complete a job (e.g., 65 seconds per job). The physical processing temporal unit data may be used to facilitate calculation of the set of wear-leveling data for the set of compute nodes (e.g., longer average job completion time may be associated with higher wear-levels). Other methods of measuring the set of physical processing temporal units are also possible.

At block 1950, based on the set of thread events, the set of wear-leveling data may be determined. As described herein, the wear-leveling data may include data and statistics that indicate a degree of usage of the set of processor modules. The wear-leveling data may include a set of wear scores in the form of integer values between 1 and 100, where lesser values (e.g., 22) represent little wear, and greater values (e.g., 72) represent relatively greater wear. In embodiments, determining the wear-leveling data may include analyzing the set of thread event data at block 1955. Various aspects of the thread-event data may be evaluated to determine the wear-leveling data. As an example, in certain embodiments, block 1955 may include ascertaining the total number of jobs performed by a set of hardware threads belonging to a particular compute node (e.g., as tracked by the PURRs for each hardware thread) and assigning a wear-score to the compute node based on the aggregate number of jobs processed by the compute node (e.g., as shown in FIG. 1800). As an additional example, determining the wear-leveling data may include calculating the average time required by a particular hardware thread to complete a job over a period of time, and detecting a change in average job completion time over an extended time period (e.g., components with greater wear may take more time to complete tasks, and so increasing job completion time may be a symptom of greater wear). In certain embodiments, the frequency of error events on a particular hardware thread may be analyzed to determine the wear-level of a compute node (e.g., error events for a hardware thread may increase with wear, as a component reaches the end of its service life cycle). The techniques described herein may be used in combination with one another or with other techniques not explicitly described herein in order to determine the wear-leveling data.

At block 1970, the set of wear-leveling data may be established in a data store. As described herein, the data store may include random-access memory, databases, hard drives, solid state drives, storage devices, cloud-based storage, or other storage medium (either physical or virtual, volatile or non-volatile) for storing or encoding data and programs. Establishing the set of wear-leveling data may include creating a database, index, or other comprehensive, organized collection for maintaining the wear-leveling data for each processor module. In embodiments, the data store may be configured to be accessible either locally or remotely. Accordingly, at block 1975, establishing the set of wear leveling data in the data store may include recording the wear-leveling data on a compute node. For instance, the compute node may include a local compute node that shares a local network connection with the compute node from which the wear-leveling data was collected. In certain embodiments, establishing the set of wear-leveling data in the data store may include recording the wear-leveling data on a remote compute node that is physically separated from the compute node. For example, the remote compute node may be a server configured to act as a central storage device for aggregate wear-leveling data from multiple compute nodes on different networks. Other methods of establishing the set of wear-leveling data on a data store are also possible.

Figure 20:
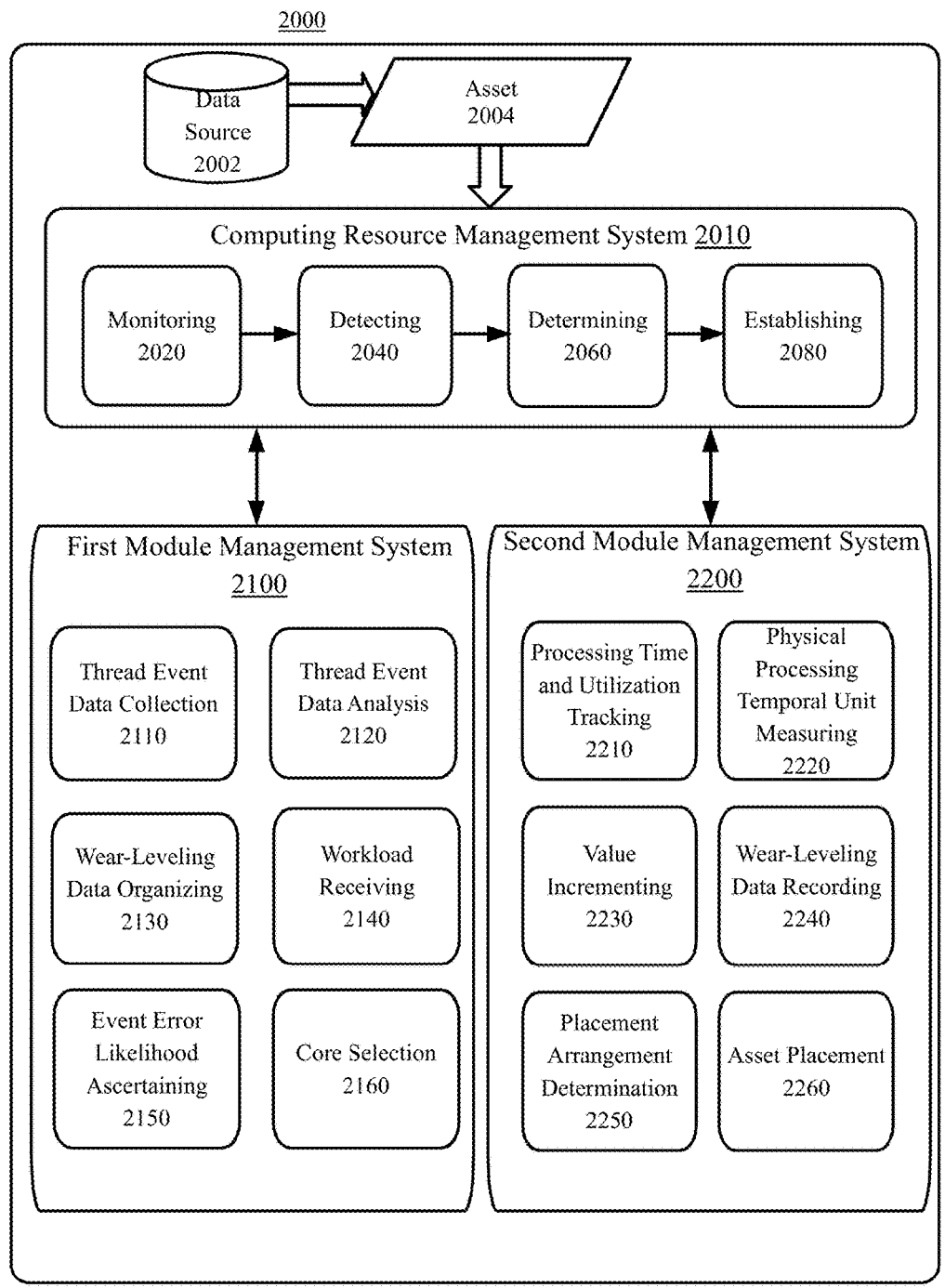
FIG. 20 depicts an example system architecture for implementing a method for managing asset placement based on processor utilization, according to embodiments.

FIG. 20 depicts an example system architecture 2000 for implementing a method for managing asset placement based on processor utilization. Aspects of the system architecture 2000 are directed toward calculating wear-leveling data for a set of compute nodes based on thread event data (e.g., jobs per thread) and determining placement for a set of assets on the set of compute nodes based on the wear leveling data. The system 2000 may include a data source 2002, an asset 2004, a computing resource management system 2010, a monitoring module 2020, a detecting module 2040, a determining module 2060, an establishing module 2080, a first module management system 2100, a second module management system 2200, and a number of modules, sub-modules, and other operations configured to facilitate aspects of asset placement based on system bus traffic.

Aspects of the example system architecture 2000 are directed toward calculating wear-leveling data for a set of compute nodes based on processor utilization (e.g., hardware thread usage) and determining placement for a set of assets on the set of compute nodes based on the wear-leveling data. As shown in FIG. 20, the example system architecture may include a data source 2002. The data source 2002 may include a database, storage device, computer network, cloud environment, or other data storage element. The system 2000 may also include an asset 2004. The asset 2004 may include a virtual machine, processing thread, data volume, workload, or other form of data. In embodiments, the asset 2004 may be configured to be maintained on the data source 2002.

In embodiments, the monitoring block 2020 of the computing resource management system 2010 may be configured to monitor and track processing time and processor utilization in a simultaneous multithreading environment. In embodiments, the processing time and processor utilization may be tracked using a set of processor resource registers (PURRs) corresponding to a set of hardware threads of a compute node. As described herein, at detecting block 2040 the computing resource management system 2010 may be configured to detect a set of thread events with respect to the set of physical cores of the set of compute nodes. The set of thread events may include software thread dispatches (e.g., job allocations), error events, job completion events, or other events occurrences related to the hardware threads. Based on the set of thread events, at block 2060 the set of thread event data may be analyzed to determine the set of wear-leveling data for the set of compute nodes. Determining the set of wear-leveling data for the set of compute nodes may include using one or more techniques or algorithms to assign a quantitative index to each compute node that indicates its degree of utilization. In embodiments, as described herein, the wear-levels assigned to each compute node may be based on the number of jobs assigned to hardware threads of the compute node, time to completion, error event frequency, or other aspect of the thread events. At establishing block 2080 the computing resource management system 2010 may include establishing the set of wear-leveling data in a data store. Establishing the set of wear-leveling data in a data store may include recording, storing, saving, or maintaining the wear-leveling data in a local or remote data storage system.

As described herein, aspects of the disclosure are directed toward determining a set of wear-leveling data for a set of compute nodes based on processor utilization. At block 2110 of the first module management system 2100, aspects of the disclosure are directed toward collecting the thread event data. Collecting the thread event data may include gathering, computing, aggregating, counting, measuring or otherwise acquiring information related to the degree of utilization of the system bus. For instance, as described herein, collecting the thread event data may include using a set of PURRs to monitor and detect the thread event data. Based on the collected set of thread traffic data, block 2130 may be configured to analyze the set of thread event data. Analyzing the set of thread event data may include examining, evaluating, or assessing the set of thread event data to determine the degree of utilization of a processing module of a compute node. For instance, analyzing the set of thread event data may include evaluating a variety of factors, such as assessing the number of jobs assigned to the hardware threads of a compute node, job completion time, error event frequency, or other aspect of the thread events data. As an example, analyzing the thread events may include establishing a utilization history graph for each hardware thread. The utilization history graph may show the average job completion time, thread count, and error event frequency as a function of time over a specified time period. Trends (e.g., increasing error event frequency, slower job completion time) may be identified and quantified to facilitate calculation of the wear-leveling data for the set of compute nodes. Other methods of determining the set of wear-leveling data are also possible.

At block 2130, the first module management system 2100 may be configured to organize the set of wear-leveling data based on a lesser utilized hardware factor which indicates a lesser likelihood of a hardware error event. The lesser utilized hardware factor may be a flag, mark, tag, or other indicator that a particular hardware component has been utilized to a lesser degree relative to other hardware components on the network. Organizing the set of wear-leveling data may include sorting, arranging, or systematizing the wear-leveling data to prioritize usage of hardware components that are less utilized and have lower wear levels. As an example, organizing the wear-leveling data may include establishing a ranked list of the hardware components on the network, where frequently used components are given a lower ranking and less frequently used components are given a higher ranking (e.g., lesser utilized hardware may be less likely give rise to an error event.) As described herein, prioritization of lesser used hardware components may be associated with benefits such as reduced hardware error events.

At block 2140, aspects of the disclosure are directed toward receiving a workload. The workload may be a task, job, software thread, or other operation configured to be performed by a computer node. In embodiments, the workload may be received by a compute node of the set of compute nodes. At block 2150, in response to receiving the access request, the first module management system 2100 may be configured to ascertain that a first physical core has a lesser likelihood of a physical core error event in comparison to a second physical core. Ascertaining that the first core has a lesser likelihood of a physical core event may be based on the thread event data collected at block 2110. For instance, the thread event data may indicate that the second core has a history of more frequent error events (e.g., abnormal job termination error, lack of resources error) than the first core. In response to determining that the first core has a lesser error likelihood than the second core, at block 2160 the first core may be selected to process the workload. In certain embodiments, selecting the core to process the workload may also be determined based on the set of wear-leveling data. For example, in certain embodiments, the core with the lowest wear level (e.g., least amount of past utilization) may be selected for processing the workload.

At block 2210, the second module management system 2200 may be configured to track processing time and utilization of the hardware threads of the set of compute nodes. In embodiments, at block 2220, tracking the processing time and utilization may include measuring physical processing temporal units. As described herein, tracking of processing time, utilization, and temporal units may be performed by a set of PURRs configured to monitor the activity and usage of the set of processing modules. The set of PURRs may be configured to track and record a variety of statistics including number of tasks/jobs scheduled on each hardware thread, job completion time, job intensity, error event data, and the like. At block 2230, aspects of the disclosure are directed toward incrementing a value of the set of physical processing temporal units in response to a hypervisor scheduling a job on one or more of the hardware threads. Generally, incrementing the value of the set of processing temporal units may include adjusting or modifying the processing speed of one or more of the processing cores. As an example, in response to determining that a particular job is processing resource intensive, the core on which it is placed by be adjusted to a higher clock frequency in order to achieve better performance. Other methods of incrementing the set of physical processing temporal units are also possible.

At block 2240, the second module management system 2200 may include recording the set of wear-leveling data in a data store. The data store may include random-access memory, database, hard drives, solid state drives, storage devices, cloud-based storage, or other storage medium (either physical or virtual, volatile or non-volatile) for storing or encoding data and programs. In embodiments, the data store may be part of the local compute node from which the wear-leveling data was collected. In certain embodiments, the data store may be a remote server configured to act as a central storage device for aggregate wear-leveling data from multiple compute nodes on different networks. Other methods of establishing the set of wear-leveling data on a data store are also possible.

At block 2250, consistent with aspects described herein, a placement arrangement for a set of virtual machines may be determined. Generally, the placement arrangement may include a configuration for deployment of the set of virtual machines to a plurality of hosts (e.g., a set of compute nodes). An example placement arrangement may prioritize accommodation of assets to hosts that have lower wear levels (e.g., associated with longer remaining usage life spans). The placement arrangement for the set of virtual machines may be determined based on the wear-leveling data for the processing modules of the set of compute nodes. Based on the placement arrangement, at block 2260 the set of virtual machines may be placed on the set of hosts. Placing the set of virtual machines may include allocating, assigning, deploying, or otherwise designating the virtual machines to the set of compute nodes. Other methods of determining the placement arrangement and placing the set of virtual machines are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing virtual machine (VM) placement related to a shared pool of configurable computing resources comprising a plurality of hosts, wherein each host comprises a plurality of hardware components including a plurality of different hardware component types, and wherein the different component types include at least a processor component type, the system comprising:
    a memory having a set of computer readable computer instructions, and
    a processor for executing the set of computer readable instructions, the set of computer readable instructions including:
    detecting a respective set of wear-leveling data for each host of the plurality of hosts, each set of wear leveling data includes a plurality of sets of component usage data, wherein each set of component usage data respectively corresponds to an individual different component type and indicates a degree of historical utilization of the respectively corresponding hardware component type in the host, and wherein the set of component usage data for the processor components for at least one of the hosts is determined based on a set of thread event data collected at the at least one host via monitoring a set of processor utilization resource registers (PURRs);
    ascertaining a respective set of component prioritization data for each VM of a plurality of VMs, wherein each set of component prioritization data specifies one or more operational priorities that respectively correspond to the different component types indicating a degree of importance of the respective component type relative to the other different component types;
    determining a placement arrangement for the VMs with respect to the plurality of hosts, wherein the determining comprises, for each VM of the plurality of VMs:
        identifying, using the set of component prioritization data for the VM, the component type with the highest degree of importance for the VM;
        identifying, using the sets of wear-leveling data, a compatible host of the plurality of hosts that has the lowest degree of historical utilization of the identified component type compared to the other hosts of the plurality of hosts; and
        storing, in the placement arrangement, an indication that the VM is matched with the identified compatible host; and
    placing, based on the placement arrangement, each VM of the plurality of VMs on the host matched to the VM.

2. A computer-implemented method for managing virtual machine (VM) placement related to a shared pool of configurable computing resources comprising a plurality of hosts, wherein each host comprises a plurality of hardware components including a plurality of different hardware component types, and wherein the different component types include at least a processor component type, the method comprising:
    detecting a respective set of wear-leveling data for each host of the plurality of hosts, each set of wear leveling data includes a plurality of sets of component usage data, wherein each set of component usage data respectively corresponds to an individual different component type and indicates a degree of historical utilization of the respectively corresponding hardware component type in the host, and wherein the set of component usage data for the processor components for at least one of the hosts is determined based on a set of thread event data collected at the at least one host via monitoring a set of processor utilization resource registers (PURRs);
    ascertaining a respective set of component prioritization data for each VM of a plurality of VMs, wherein each set of component prioritization data specifies one or more operational priorities that respectively correspond to the different component types indicating a degree of importance of the respective component type relative to the other different component types;
    determining a placement arrangement for the VMs with respect to the plurality of hosts, wherein the determining comprises, for each VM of the plurality of VMs:
        identifying, using the set of component prioritization data for the VM, the component type with the highest degree of importance for the VM;
        identifying, using the sets of wear-leveling data, a compatible host of the plurality of hosts that has the lowest degree of historical utilization of the identified component type compared to the other hosts of the plurality of hosts; and
        storing, in the placement arrangement, an indication that the VM is matched with the identified compatible host; and
    placing, based on the placement arrangement, each VM of the plurality of VMs on the host matched to the VM.

3. A computer program product for managing virtual machine VM placement related to a shared pool of configurable computing resources comprising a plurality of hosts, wherein each host comprises a plurality of hardware components including a plurality of different hardware component types, and wherein the different component types include at least a processor component type, the computer program product comprising a computer readable storage medium having program instructions embodied therewith, wherein the computer readable storage medium is not a transitory signal per se, the program instructions executable by a processor to cause the processor to perform a method comprising:

detecting a respective set of wear-leveling data for each host of the plurality of hosts, wherein each set of wear leveling data includes a plurality of sets of component usage data, wherein each set of component usage data respectively corresponds to an individual different component type, and indicates a degree of historical utilization of the respectively corresponding hardware component type in the host, and wherein the set of component usage data for the processor components for at least one of the hosts is determined based on a set of thread event data collected at the at least one host via monitoring a set of processor utilization resource registers (PURRs);

ascertaining a respective set of component prioritization data for each VM of a plurality of VMs, wherein each set of component prioritization data specifies one or more operational priorities that respectively correspond to ones of the different component types indicating a degree of importance of the respective component type relative to the other different component types;

determining a placement arrangement for the VMs with respect to the plurality of hosts, wherein the determining comprises, for each VM of the plurality of VMs:
        identifying, using the set of component prioritization data for the VM, the component type with the highest degree of importance for the VM,
        identifying, using the sets of wear-leveling data, a compatible host of the plurality of hosts that has the lowest degree of historical utilization of the identified component type compared to the other hosts of the plurality of hosts, and
        storing, in the placement arrangement, an indication that the VM is matched with the identified compatible host; and placing, based on the placement arrangement, each VM of the plurality of VMs on the host matched to the VM.

\* \* \* \* \*